(12) United States Patent
Sung

(10) Patent No.: US 11,070,700 B2
(45) Date of Patent: Jul. 20, 2021

(54) METHOD OF EXTRACTING WATERMARK DATA IN AN IMAGE WITH REFERENCE TO A NOISE-BASED IMAGE LOCATED IN THE IMAGE BASED ON A COMPARISON PROCESS PERFORMED IN THE FREQUENCY DOMAIN

(71) Applicants: Beyontech, Inc., Long Grove, IL (US); Haroo Company, Seoul (KR)

(72) Inventor: Joon-ho Sung, Seoul (KR)

(73) Assignees: Beyontech, Inc, Long Grove, IL (US); Haroo Company, Seoul (KR)

( * ) Notice: Subject to any disclaimer, the term of this patent is extended or adjusted under 35 U.S.C. 154(b) by 0 days.

(21) Appl. No.: 16/925,970

(22) Filed: Jul. 10, 2020

(65) Prior Publication Data
US 2020/0412906 A1     Dec. 31, 2020

Related U.S. Application Data

(62) Division of application No. 16/380,729, filed on Apr. 10, 2019, now Pat. No. 10,757,292.

(51) Int. Cl.
  *H04N 1/32*     (2006.01)
  *G06T 1/00*     (2006.01)
  *G06T 5/50*     (2006.01)

(52) U.S. Cl.
  CPC .......... *H04N 1/3216* (2013.01); *G06T 1/005* (2013.01); *G06T 1/0021* (2013.01); *G06T 1/0028* (2013.01); *G06T 5/50* (2013.01); *H04N 1/32245* (2013.01); *G06T 2201/0052* (2013.01); *G06T 2201/0061* (2013.01); *G06T 2201/0065* (2013.01); *H04N 2201/3233* (2013.01)

(58) Field of Classification Search
  CPC .......................... H04N 1/32144–32352; H04N 2201/3233–324; G06T 1/0021–0092; G06T 2201/005–0601
  See application file for complete search history.

(56) References Cited

U.S. PATENT DOCUMENTS

| | | | | |
|---|---|---|---|---|
| 6,094,483 A | * | 7/2000 | Fridrich | G06T 1/0021 375/E7.026 |
| 7,031,493 B2 | * | 4/2006 | Fletcher | G06T 1/0028 382/100 |
| 7,130,442 B2 | * | 10/2006 | Braudaway | G06T 1/005 382/100 |
| 7,324,662 B2 | * | 1/2008 | Kot | G06T 1/0028 370/522 |

* cited by examiner

*Primary Examiner* — Scott A Rogers
(74) *Attorney, Agent, or Firm* — Bishop, Diehl & Lee, Ltd.

(57) ABSTRACT

Provided is a method of embedding and extracting watermark data that is robust against geometric distortion and low-quality photographing and for which the probability of successfully extracting watermark data for an original image is high, while the probability of successfully extracting the watermark data in the case of unauthorized copying is seriously impaired. The data embedding method according to an embodiment of the present invention comprises a step of converting the noise-based image using watermark data, and a step of adjusting the original image using the converted noise-based image.

4 Claims, 29 Drawing Sheets

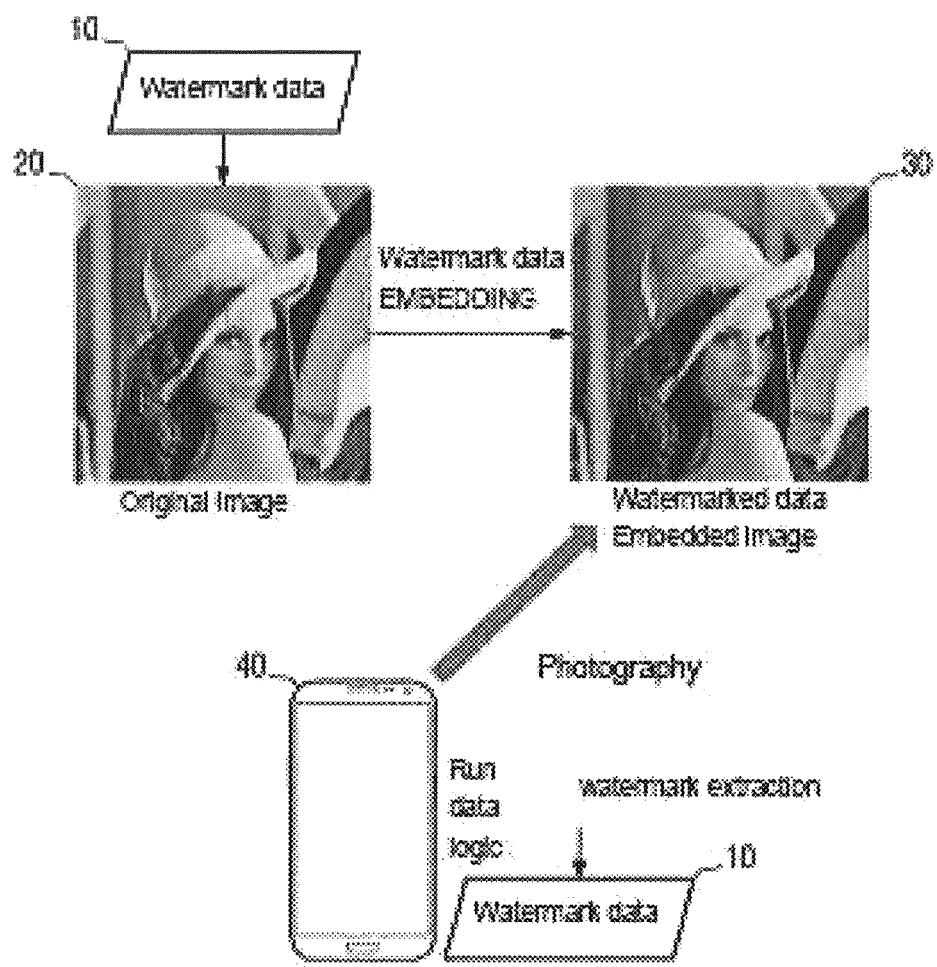

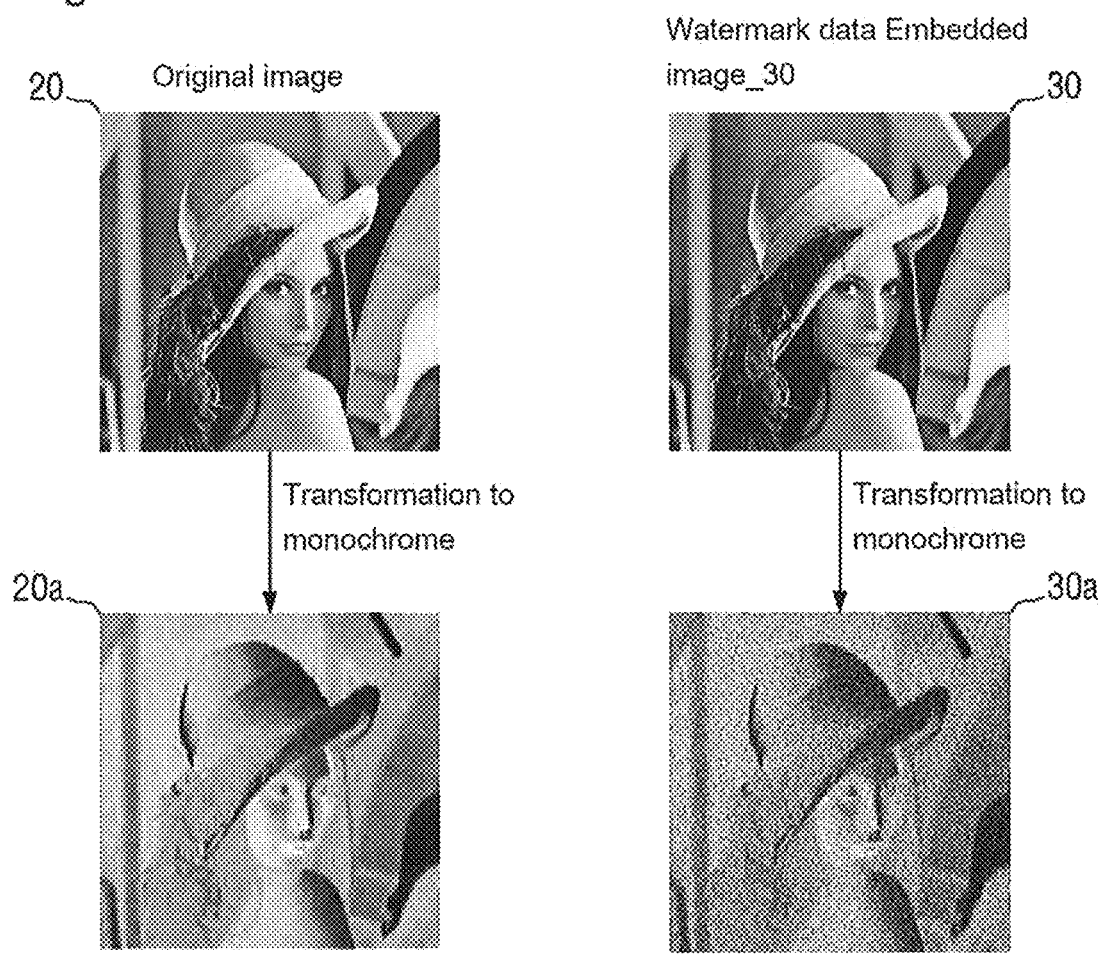

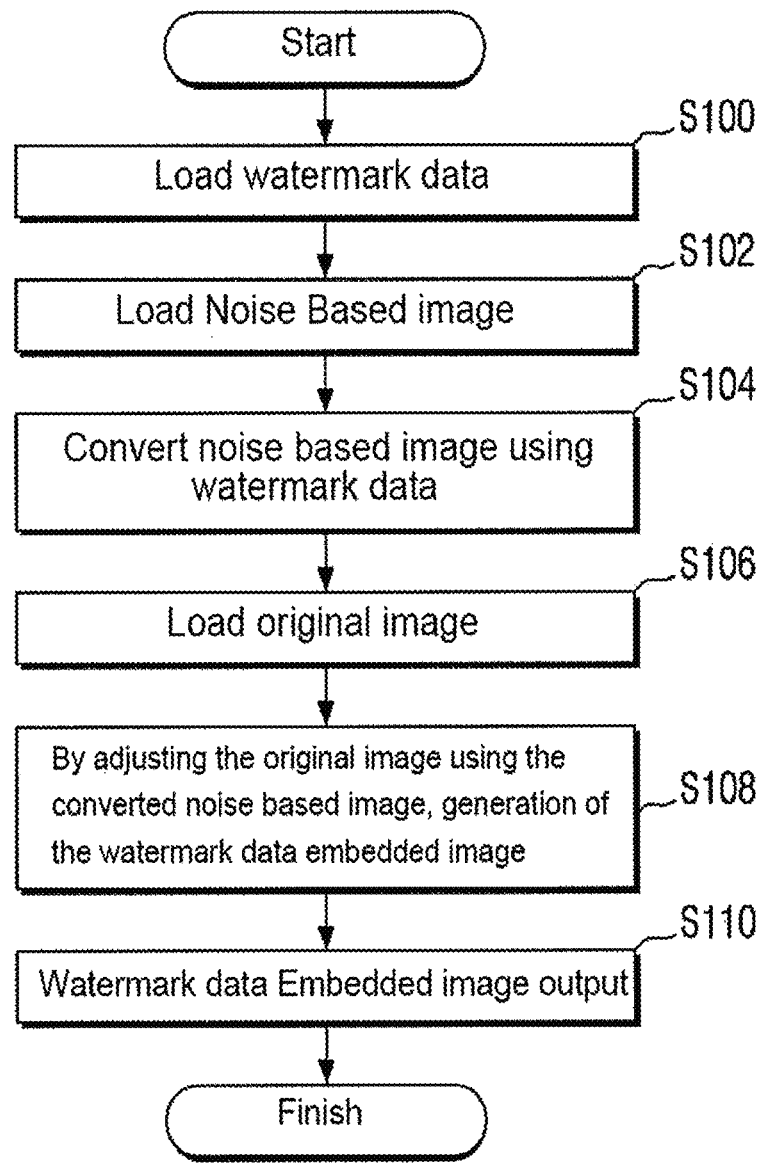

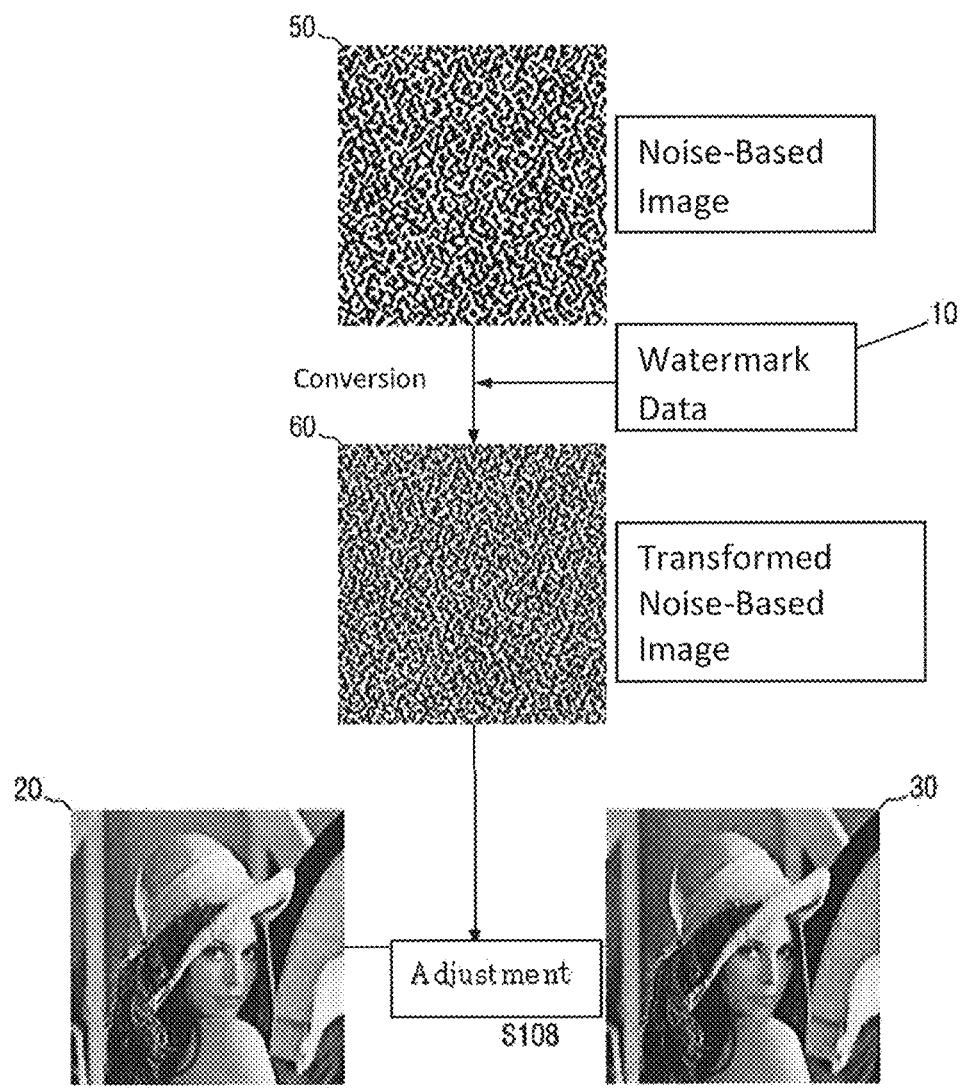

case 1
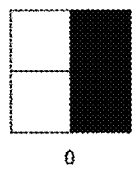 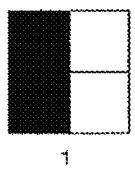
    0          1
case 2
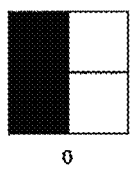 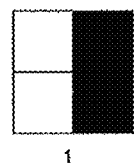
    0          1
FIG. 4B
case 3
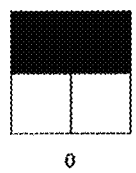 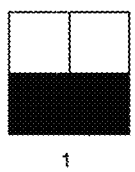
    0          1
case 4
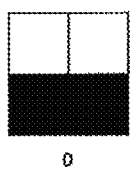 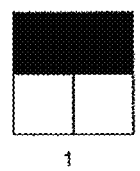
    0          1
case 5
 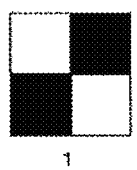
    0          1
case 6
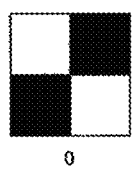 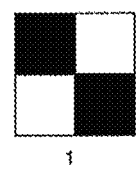
    0          1
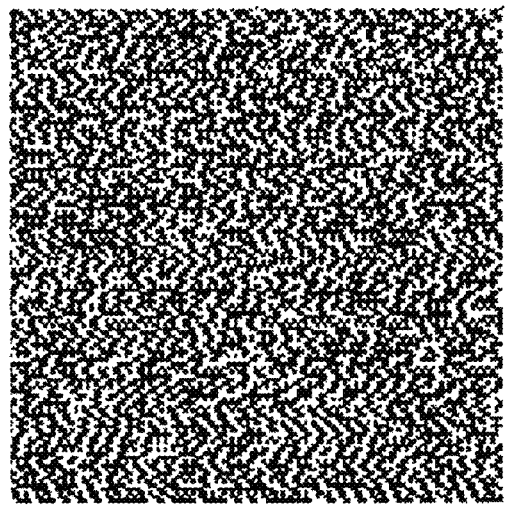
Previous Converted Noise-Based Image
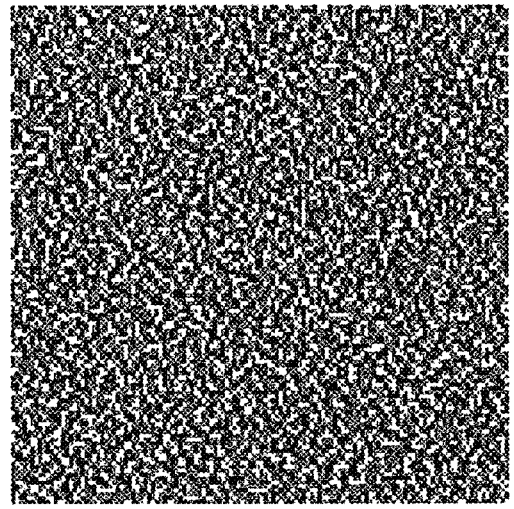
Current Converted Noise-Based Image
FIG. 4C

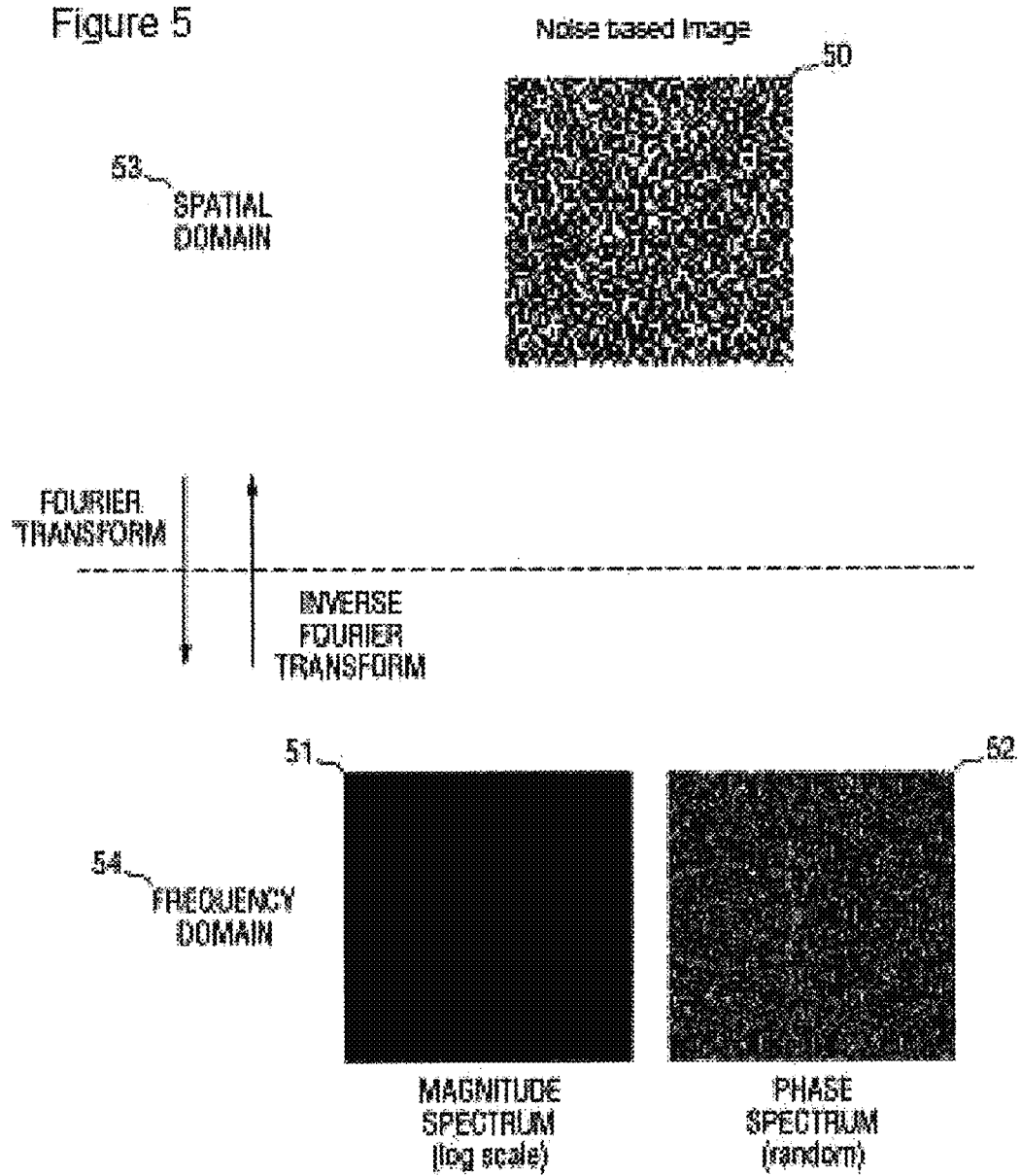

Figure 9
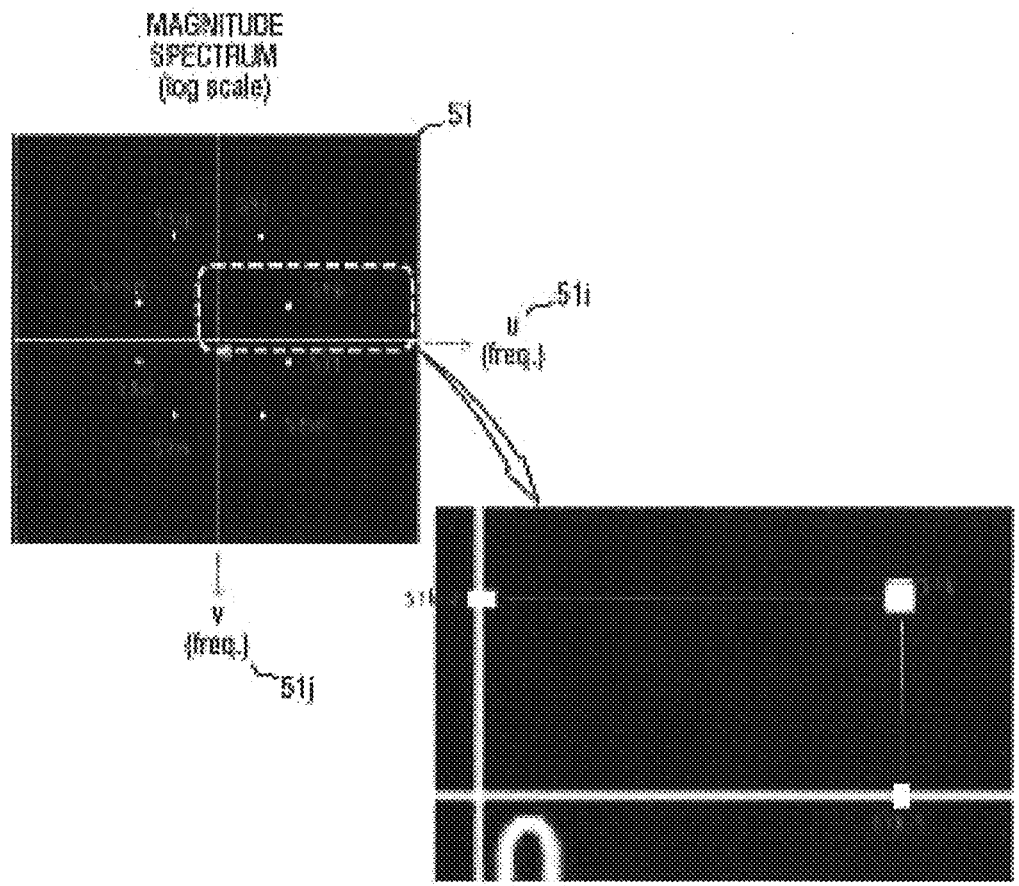
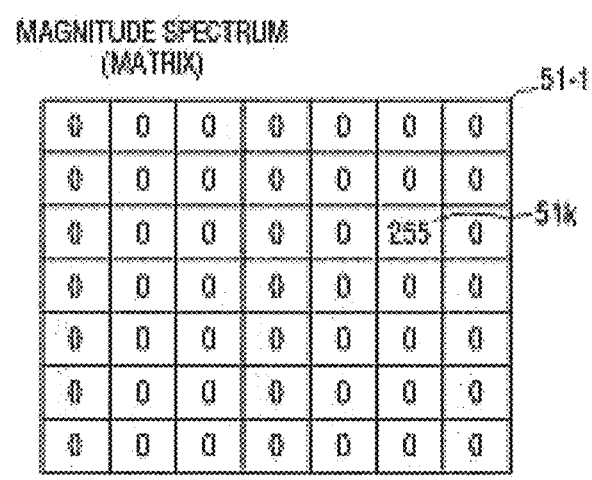

Fig.10
256 x 256
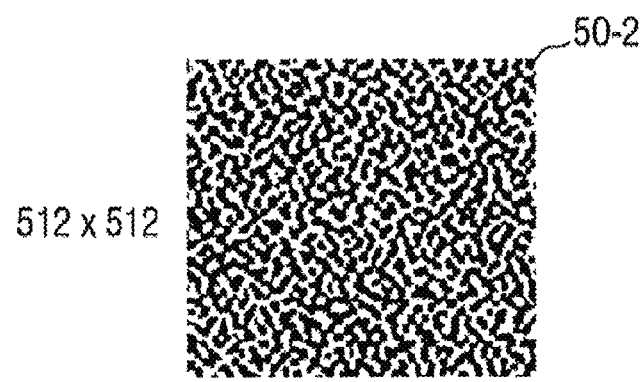
512 x 512
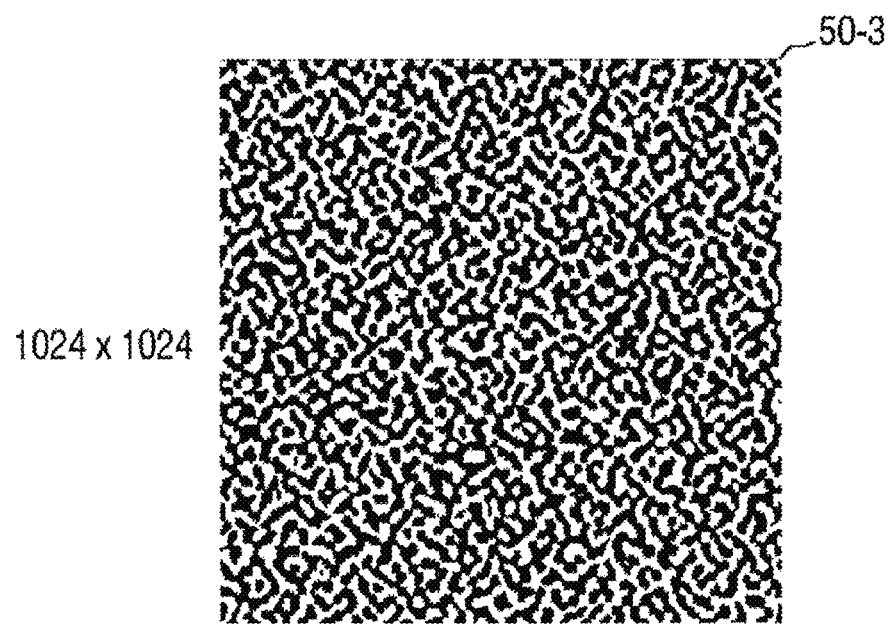
1024 x 1024

Figure 14
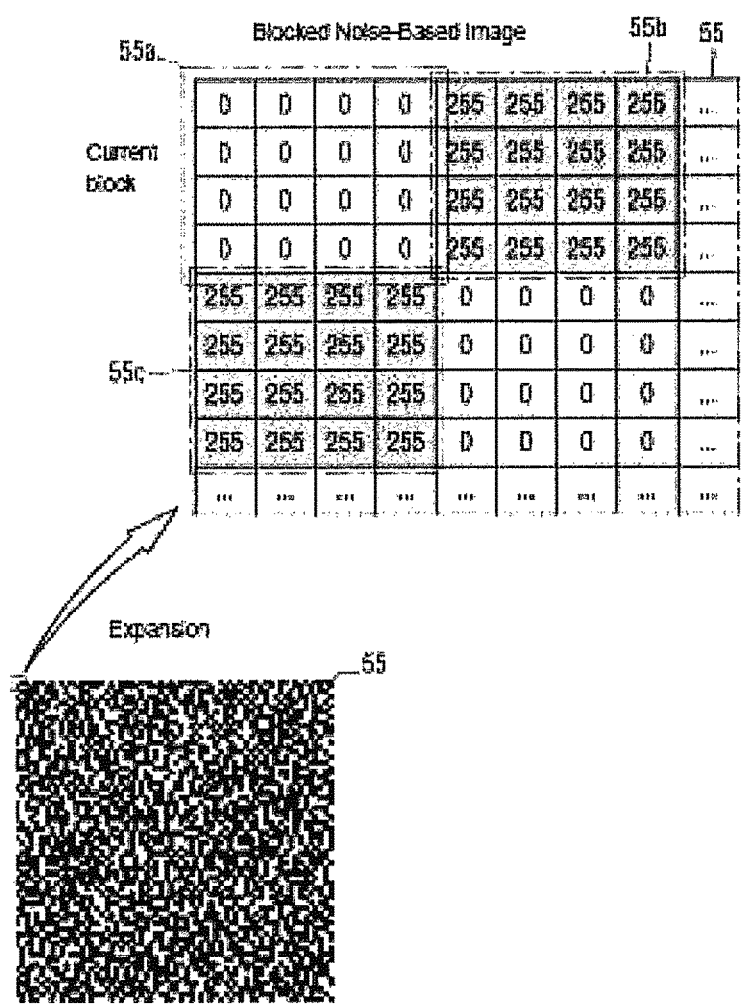

| WaterMarkingData (2 bits) | Current block | Block partial conversion |
|---|---|---|
| 00 | White color | Upper left (2 x 2 pixels) to black |
| 01 | | Upper right (2 x 2 pixels) to black |
| 10 | | Bottom left (2 x 2 pixels) to black |
| 11 | | Bottom right (2 x 2 pixels) to black |
| 00 | Black color | Upper left (2 x 2 pixels) white |
| 01 | | Upper right (2 x 2 pixels) to white |
| 10 | | The lower left corner (2 x 2 pixels) |
| 11 | | Bottom right (2 x 2 pixels) in color |

Current reflected bit

WaterMarkData[144] = 01010010101010101000110101010101....

Figure 17

Blocked noise-based image 72 blocks required for 144 bit WaterMark Data Embedding (8 x 9)

| BLK | BLK | BLK | BLK | BLK | BLK | BLK | BLK | ... |
|-----|-----|-----|-----|-----|-----|-----|-----|-----|
| BLK | BLK | BLK | BLK | BLK | BLK | BLK | BLK | ... |
| BLK | BLK | BLK | BLK | BLK | BLK | BLK | BLK | ... |
| BLK | BLK | BLK | BLK | BLK | BLK | BLK | BLK | ... |
| BLK | BLK | BLK | BLK | BLK | BLK | BLK | BLK | ... |
| BLK | BLK | BLK | BLK | BLK | BLK | BLK | BLK | ... |
| BLK | BLK | BLK | BLK | BLK | BLK | BLK | BLK | ... |
| BLK | BLK | BLK | BLK | BLK | BLK | BLK | BLK | ... |
| BLK | BLK | BLK | BLK | BLK | BLK | BLK | BLK | ... |

The data decoding device

METHOD OF EXTRACTING WATERMARK DATA IN AN IMAGE WITH REFERENCE TO A NOISE-BASED IMAGE LOCATED IN THE IMAGE BASED ON A COMPARISON PROCESS PERFORMED IN THE FREQUENCY DOMAIN

CROSS-REFERENCE TO RELATED APPLICATIONS

The present application is a divisional of, claims priority to, and incorporates herein by reference, U.S. patent application Ser. No. 16/380,729 filed on Apr. 10, 2019, now U.S. Pat. No. 10,757,292.

TECHNICAL FIELD OF THE INVENTION

The present invention relates to methods of embedding and extracting watermark data. More particularly, it relates to both a method for embedding watermark data into an image in a manner that cannot be recognized by human vision but can then be extracted through image processing, and a method for extracting the embedded watermark data from the image.

BACKGROUND OF THE INVENTION

Using watermarking technology, it is possible to insert watermark data or watermarking textures on an original image that are not visible on the original but are revealed in unauthorized reproduction. Such watermarking technology is widely used for article or copy authentication. However, while it is possible to extract the watermark data by image processing through a computing device without being seen by humans, it is not possible to provide a watermarking technique that cannot be extracted in the case of unauthorized copying.

The technical problem to be solved by the present invention is to provide methods of embedding and extracting watermark data that are robust against geometric distortion and low-quality photographing and for which the probability of successfully extracting watermark data for an original image is high, while the probability of successfully extracting the watermark data in the case of unauthorized copying is seriously impaired.

Another technical problem to be solved by the present invention is to provide methods of embedding and extracting watermark data wherein the quality of the original image is not impaired due to the embedding of the watermark data, and it is not revealed whether or not watermark data is embedded.

Yet another technical problem to be solved by the present invention is to provide methods of embedding and extracting watermark data wherein as the size of the original image increases, the size of embeddable watermark data also increases.

Yet another technical problem to be solved by the present invention is to provide methods of embedding and extracting watermark data that minimizes the likelihood that the clues associated with the embedding and extraction methods will be discovered.

Yet another technical problem to be solved by the present invention is to provide methods of embedding and extracting watermark data wherein even if the material on which the image is printed is changed, there is no problem in extracting the watermark data.

Yet another technical problem to be solved by the present invention is to provide embedding and extraction methods that can be applied regardless of the size of the image.

The technical problems of the present invention are not limited to the above-mentioned technical problems; other technical subjects not mentioned may be clearly understood by those skilled in the art from the following description.

SUMMARY OF THE INVENTION

In order to solve the above technical problems, a method of embedding watermark data in an original image according to one embodiment of the present invention comprises the steps of converting a noise-based image using watermark data, and adjusting the original image using the converted noise-based image. At this time, the noise-based image is represented by a two-dimensional magnitude spectrum and a random phase having a magnitude peak of a predetermined coordinate in the frequency domain.

In specific embodiments, the noise-based image is represented by a plurality of magnitude peaks and a random phase in the frequency domain; the plurality of magnitude peaks each consist of a plurality of magnitude peaks formed at pre-designated coordinates. At this time, the plurality of magnitude peaks may be composed of a specific number of the magnitude peaks. The frequency domain is constructed as a result of performing discrete Fourier Transformation of the noise-based image, wherein each of the magnitude peaks comprised in the plurality of magnitude peaks is represented by a first frequency of a horizontal axis and a second frequency of a vertical axis, and the first frequency and the second frequency may correspond to one unit frequency according to the discreteness of the frequency.

In specific embodiments, the magnitude value of the magnitude peak is a first value, and the noise-based image has a magnitude spectrum in which a magnitude value of all regions except for the magnitude peak in a frequency domain has a second value different from the first value. In this case, the first value may be a maximum magnitude value, and the second value may be a minimum magnitude value.

In specific embodiments, the random phase is generated using a fixed key value.

In specific embodiments, the step of converting the original image using the converted noise-based image comprises a step of connecting a plurality of the converted noise-based images in at least one of a horizontal direction and a vertical direction based on the size of the original image.

In specific embodiments, the step of converting the noise-based image using the watermark data comprises the steps of constructing the noise-based image in block units having M×M pixels, unifying all the pixels belonging to a block to either white or black for each block, and reflecting the watermark data by two bits to each of the blocks while circulating the blocks. In this case, the step of reflecting the watermark data by two bits to each of the blocks while circulating the blocks may comprise the steps of converting some pixels belonging to the current block into black according to the two bit value to be reflected if the current block is white, and converting some pixels belonging to the current block into white according to the two bit value to be reflected if the current block is black. At this time, each of the blocks is configured with a first pixel group comprising upper left N×N pixels (where N=M/2), a second pixel group comprising upper right N×N pixels, a third pixel group comprising lower left N×N pixels and a fourth pixel group comprising lower right N×N pixels; the steps of converting some pixels belonging to the current block into black according to the two bit value to be reflected if the current block is white, and converting some pixels belonging to the current block into white according to the two bit value to be reflected if the current block is black may comprise the steps of converting any one of the first pixel group, the second pixel group, the third pixel group, and the fourth pixel group belonging to the current block into black according to the two bit value to be reflected if the current block is white; and converting any one of the first pixel group, the second pixel group, the third pixel group, and the fourth pixel group belonging to the current block into white according to the two bit value to be reflected if the current block is black.

In specific embodiments, the step of adjusting the original image using the transformed noise-based image comprises a step of adjusting the first pixel only when the R channel value, the G channel value, and the B channel value of the first pixel of the original image exceed or fall short of the threshold value. At this time, the step of adjusting the current pixel of the original image comprise the steps of first-adjusting the first pixel if the second pixel of the transformed noise-based image is white, and second-adjusting the first pixel by a rule different from the first adjusting if the second pixel is black; the first pixel and the second pixel may be corresponding in position in an image. At this time, the first adjusting may reduce the R channel value, increase the G channel value, and reduce the B channel value of the first pixel; and the second adjusting may increase the R channel value, decrease the G channel value, and increase the B channel value of the first pixel.

In order to solve the above technical problem, a computer program for embedding watermark data in an original image in combination with a computing device according to another embodiment of the present invention is stored in a recording medium in order to execute the steps of converting the noise-based image using the watermark data, and adjusting the original image using the converted noise-based image. At this time, the noise-based image is represented by a two-dimensional magnitude spectrum and a random phase having a magnitude peak of a specific coordinate designated in the frequency domain.

In order to solve the above technical problem, a data extraction method for extracting watermark data from a captured image wherein the watermark data are embedded, according to another embodiment of the present invention, comprises a step wherein, by performing the frequency domain process of comparing the photographed image with the noise-based image, a second two-dimensional result matrix is generated indicating whether the noise-based image is comprised in the captured image; a step wherein the second result matrix is transformed into a spatial domain to generate a second reference image; a step of determining a reference point that is an extraction position of the watermark data in the captured image using the second reference image; and a step of extracting the watermark data from a reference point of the photographed image with reference to the noise-based image. In this case, the noise-based image may be represented by a two-dimensional magnitude spectrum and a random phase having a magnitude peak of a specific coordinate designated in the frequency domain.

In specific embodiments, before the step of generating the second result matrix, a step is further comprised of generating a correction image from the captured image, wherein the step of generating the second two-dimensional result matrix comprises a step of performing the frequency domain process of comparing the corrected image with the noise-based image, so that a second result matrix is generated indicating whether the noise-based image is comprised in the corrected image; the step of determining a reference point that is an extraction position of the watermark data comprises a step of determining the reference point in the corrected image, and the step of extracting the watermark data comprises a step of extracting the watermark data from a reference point of the corrected image. At this time, the step of generating the correction image from the captured image comprises a step of performing LogPolar transformation on the noise-based image and the captured image to calculate a scale and a rotation angle of the captured image with respect to the noise-based image, and a step of generating the corrected image from the shot image by reflecting the scale and the rotation angle.

In specific embodiments, the step of calculating the scale and rotation angle relative to the noise-based image of the shot image may comprise a step of converting the captured image into a frequency domain; a step of generating a 2D magnitude spectrum image (MS2) of the photographed image transformed into the frequency domain, a step of inquiring or generating the 2D magnitude spectrum image (MS1) of the noise-based image, a step of performing a LogPolar transformation on the image MS1 to produce a resulting image LP1; a step of performing a LogPolar transformation on the image MS2 to produce a resulting image (LP2), a step of converting the image LP1 into a frequency domain to generate a frequency matrix f_LP1, a step of onverting the image LP2 into a frequency domain to generate a frequency matrix f_LP2, a step of generating a first result matrix by multiplying the frequency matrix f_LP1 and the frequency matrix f_LP2 by each other and then dividing the frequency matrix f_LP2 by the magnitude matrix MM2 of the frequency matrix f_LP2, a step of transforming the RESULT matrix into a spatial domain to generate a first reference image and a step of calculating a scale and a rotation amount with respect to the noise-based image of the photographed image using the first reference image.

In specific embodiments, the step of calculating the scale and the rotation amount with respect to the noise-based image of the photographed image using the first reference image may comprise a step of selecting a reference pixel having a maximum value among pixel values of the first reference image; a step of determining an X coordinate of the reference pixel as the rotation angle, and s step of determining a Y coordinate of the reference pixel as the scale.

In specific embodiments, the step of calculating the scale and the rotation amount with respect to the noise-based image of the photographed image using the first reference image may comprise a step of determining a maximum value of pixel values of the first reference image as a first similarity, and a step of stopping the data extraction when the first degree of similarity is below the threshold value.

In specific embodiments, the step of converting the captured image into the frequency domain may comprise a step of monochromatically converting the photographed image to maximize the expression of noise inherent in the photographed image, and a step of converting the monochromated shot image into a frequency domain.

In specific embodiments, before the step of generating the second result matrix, a step is further comprised of generating a correction image from the captured image and monochromating the correction image to maximize the expression of the noise inherent in the corrected image; wherein the step of generating the second two-dimensional result matrix comprises a step of performing the frequency domain process of comparing the monochromated corrected image with the noise-based image, so that a second result matrix is generated indicating whether the noise-based image is comprised in the corrected image; the step of determining a reference point that is an extraction position of the watermark data comprises a step of determining the reference point in the monochromated corrected image, and the step of extracting the watermark data comprises a step of extracting the watermark data from a reference point of the monochromated corrected image.

In specific embodiments, the step of generating a second two-dimensional result matrix indicating whether the noise-based image is comprised in the monochromated corrected image comprises a step of generating or querying a first two-dimensional matrix indicating the noise-based image of the frequency domain, a step of generating a second two-dimensional matrix indicating the monochromated corrected image of the frequency domain, and a step of multiplying the first matrix by the second matrix and then dividing by a magnitude matrix of the corrected image of the frequency domain to generate the second result matrix.

In specific embodiments, the step of extracting the watermark data from the monochromated corrected image may comprise a step of blocking the monochromated corrected image with a block unit composed of M×M pixels based on a reference point, a step of unifying all of the pixels belonging to the partial block composed of N×N pixels (where N=M/2) into either white or black for each block of the monochromated corrected image, a step of extracting 2-bit data for each block by circulating each block of the monochromated corrected image with reference to a noise-based image blocked by block units consisting of M×M pixels, and a step of configuring the watermark data by concatenating the extracted data.

In order to solve the above technical problem, a computer program for extracting watermark data from a photographed image that is an image in which watermark data are embedded according to another embodiment of the present invention is stored in a recording medium in order to execute the following steps: a step of generating a second two-dimensional result matrix indicating whether the noise-based image is comprised in the captured image by performing a process in a frequency domain that compares the captured image with a noise-based image, a step of transforming the second result matrix into a spatial domain to generate a second reference image, a step of determining a reference point that is an extraction position of the watermark data in the captured image using the second reference image, and a step of extracting the watermark data from a reference point of the photographed image with reference to the noise-based image.

BRIEF DESCRIPTION OF THE DRAWINGS

FIG. 1 is a conceptual diagram illustrating a method of embedding watermark data according to an embodiment of the present invention and a method of extracting watermark data according to an embodiment of the present invention.

FIG. 2 is a diagram comparing an original image with an image in which watermark data are embedded according to a method of embedding watermark data according to several embodiments of the present invention.

FIG. 3 is a flowchart of a watermark data embedding method according to an embodiment of the present invention.

FIG. 4A is a conceptual diagram related to a method of embedding watermark data that can be understood with reference to FIG. 3.

FIG. 4B is an illustration of six patterns created using an encryption key for embedding watermark data.

FIG. 4C illustrates a side-by-side comparison between two distinctly different converted noise-based images.

FIG. 5 is a diagram illustrating a noise-based image referenced in several embodiments of the present invention.

FIGS. 8 and 9 are diagrams illustrating another example of a noise-based image that may be referenced in several embodiments of the present invention.

FIG. 10 is a diagram of a noise-based image of a different size that may be referenced in several embodiments of the present invention.

FIGS. 14 and 16 are views illustrating, for example, the operation in which the noise-based image is converted to represent watermark data as a result of the operation of FIG. 13.

FIG. 15 is a noise-based conversion standard referenced in some embodiments of the present invention.

FIG. 17 is a diagram illustrating a block traversal for embedding or extracting watermark data, which may be referred to in several embodiments of the present invention.

DETAILED DESCRIPTION OF THE INVENTION

Figure 6:
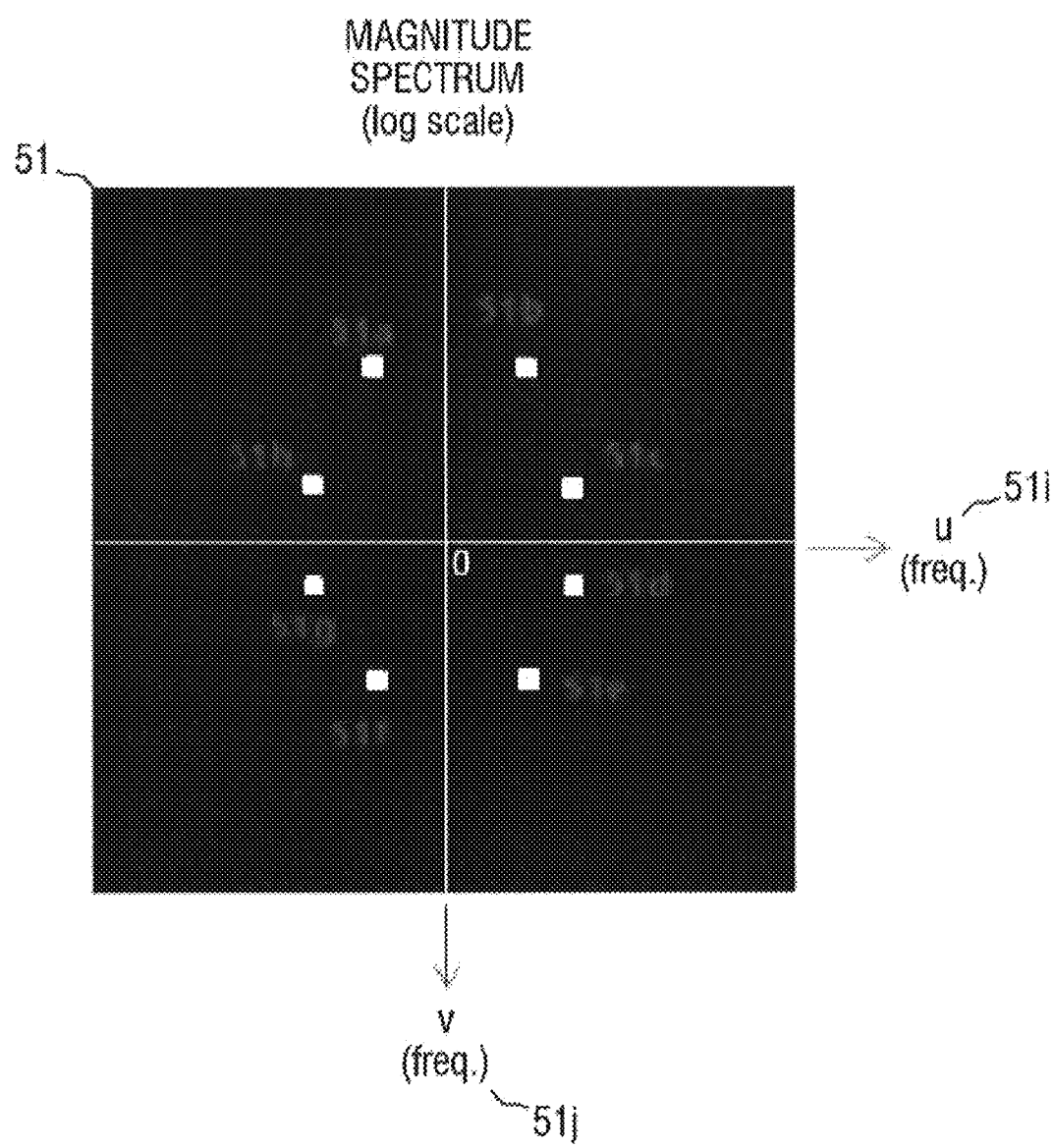
FIGS. 6 and 7 are illustrations of an example of a noise-based image that may be referenced in several embodiments of the present invention.

Hereinafter, preferred embodiments of the present invention will be described in detail with reference to the attached drawings. These and other features of the invention, and how to achieve them will be apparent with reference to the embodiments described in detail below with reference to the accompanying drawings. The present invention may, however, be embodied in many different forms and should not be construed as being limited to the embodiments set forth herein. These embodiments are provided so that the disclosure of the present invention is complete, and to fully disclose the scope of the invention to those skilled in the art to which the invention pertains; the present invention is only defined by the scope of the claims. Like reference numerals designate like elements throughout the specification.

Unless defined otherwise, all terms (including technical and scientific terms) used herein are to be construed in a manner that is commonly understood by one of ordinary skill in the art to which this invention belongs. Also, commonly used predefined terms are not ideally or excessively interpreted unless explicitly defined otherwise. The terminology used herein is for the purpose of illustrating embodiments and is not intended to be limiting of the present invention. In the present specification, the singular form includes plural forms unless otherwise specified in the specification.

Hereinafter, several practical examples of the present invention will be described with reference to the drawings.

FIG. 1 is a conceptual diagram for explaining a method of embedding watermark data according to an embodiment of the present invention and a method of extracting watermark data according to an embodiment of the present invention. First, a result image 30 in which the watermark data 10 is embedded in the original image 20 can be distributed over various channels. The resulting image 30 may be, for example, a business card or a label attached to a surface of a commodity. The resulting image 30 may also be printed on the exterior of the transportation means, such as a box.

As shown in FIG. 1, when the result image 30 is viewed, it is difficult to visually recognize whether or not watermark data are embedded. With the watermark data embedding method according to the present embodiment, it is difficult to visually recognize whether the watermark data are embedded or not, unlike the conventional techniques such as a bar code and a QR code, and it is possible to store watermark data without damaging the original image. In addition, the size of the watermark data according to the embodiment is 144 bit, and among this, utilizable data are 48 bit; a number of 248 cases can be expressed using the watermark data. Therefore, if this technology is applied to a label attached to a product surface, it is also possible to assign a unique ID to every product and to embed the ID as watermark data in the label, even if it appears as the same label to the naked eye.

It is difficult to visually recognize whether the watermark data is embedded by looking at the result image 30. However, if the user terminal 40 executing the watermark data extraction method according to several embodiments of the present invention is used, the watermark data 10 can be extracted from the resulting image 30. For example, it is possible to extract the watermark data 10 by photographing the result image 30 using a camera provided in the user terminal 40 and executing watermark data extraction logic on the photographed result.

The watermark data 10 may have the format of Table 1, for example.

TABLE 1

| Control Parameter | | | Data | | |
|---|---|---|---|---|---|
| Version Code | CRC 4 | Error Connection Bit | Body Data Bit | CRC 8 | Error Correction Bit |
| 4 bit | 3 bit | 8 bit | 54 bit | 7 bit | 68 bit |
| | | 144 bit | | | |

The control parameters in Table 1 include a verification code (CRC 4), error correction bit, and version code (4 bit), which enables verification and branching through 16 versions. This allows for 16 types of data structure version management, which allows for version updating and simultaneous operation of multiple versions in appropriate applications. The control parameters indicate the type of body data. For example, the user terminal 40 is able to extract the watermark data 10 to recognize 54-bit body data (about $10^{16}$ units of variable data) among the extracted data, and transmit the content request containing the body data and the control parameters to the content server. The content server can store a content DB that manages each content having a unique ID assigned thereto by type. The content server may provide the user terminal 40 with content of a type corresponding to the control parameter among the contents of the ID matched with the body data.

The 68-bit Error Correction Bit may comprise an error correction code to compensate for the possibility that the watermark data 10 may be erroneously extracted. For example, the error correction code may be a Bose-Chaudhuri-Hocquenghem (BCH) code.

FIG. 2 is a diagram for comparing an original image with an image in which watermark data are embedded using a method of embedding watermark data in accordance with several embodiments of the present invention. As shown in FIG. 2, the resulting image 30 is not significantly different from the original image 20 visually. However, in the resulting image 30a converted into the monochrome, noise is compared with the monochrome version 20a of the original image. This is because the watermark data according to an embodiment of the present invention is embedded in the original image in the form of noise. In this regard, reference will now be made to some of the drawings.

Embedding Watermark Data

Hereinafter, a method of embedding watermark data according to an exemplary embodiment of the present invention will be described in detail with reference to FIG. 3. The method of embedding watermark data according to the present embodiment can be executed by, for example, a computing device.

First, the device loads the original image containing the watermark data (S106). The noise-based image can be understood as a kind of data vessel that holds watermark data. The noise-based image may be loaded from an image file or in the form of data indicating a two-dimensional matrix of a frequency domain. Also, in one embodiment, it may be loaded in the form of a magnitude spectrum and a phase spectrum of the frequency domain.

The noise-based image is converted using the stored data watermark data (S104), and by adjusting the original image using the converted noise-based image, an image in which the watermark data is embedded is generated and output (S108, S110). For example, the image in which the watermark data is embedded may be output in the form of an image file, or may be printed on a printing object such as paper by a printing device. According to one embodiment, the output may be rendered in a form that is painted on the outer surface of the printing result by the 3D printer.

Referring to FIG. 4A, an understanding of a watermark data embedding method according to the present embodiment will be described. A noise-based image 50 which is a two-dimensional image is shown. The converted noise-based image 60 in which the noise-based image 50 is transformed using the watermark data 10 is also shown. The resulting image 30 in which the watermark data is embedded as a result of the adjustment of the original image 20 using the converted noise-based image 60 (S108) is generated.

As described with reference to FIGS. 3 and 4A, in the embedding method according to the present embodiment, the noise-based image plays a key role. Therefore, the noise-based image should be constructed so as to be robust against geometric distortion and to enhance the extraction success rate of watermark data, while not being easily leaked through the analysis of the resulting image 30. Referring to FIG. 5, the noise-based image used in some embodiments of the present invention will be described.

The noise-based image is represented in the form of a two-dimensional image 50 in a spatial domain 53. As is widely known, the spatial domain is transformed into a frequency domain through a Fourier transform. In the frequency domain, the noise-based image is represented by a two-dimensional magnitude spectrum 51 and a random phase spectrum 52 having a magnitude peak of a predefined specific coordinate. The random phase spectrum 52 is constructed using a random number generated by a particular key.

In one embodiment, the noise-based image has a non-zero magnitude value only in a region corresponding to the magnitude peak, and a two-dimensional magnitude spectrum 51 having a magnitude value of 0 in all regions other than the magnitude peak. Since the two-dimensional magnitude spectrum 51 is shown on the log scale in FIG. 5, the center of the spectrum image means a low frequency; the farther out it goes, the higher the frequency. The brighter the color of the spectrum image, the higher the magnitude of the frequency according to the coordinates of the point.

In one embodiment, the noise-based image has a maximum magnitude value only in an area corresponding to the magnitude peak, and has a two-dimensional magnitude spectrum 51 having a minimum magnitude value in all the regions other than the above-mentioned magnitude peak. In this embodiment, by maximizing the difference between the magnitude value of the magnitude peak and the magnitude value of the region other than the magnitude peak, the detection success rate of watermarking data embedding according to the embedding method of the present invention is increased when extracting the watermarking data.

In one embodiment, the noise-based image has a two-dimensional magnitude spectrum 51 having a plurality of the magnitude peaks. At this time, the number of the magnitude peaks is limited to a predetermined value.

The characteristics of the synchronization signal are maintained even if the image is partially damaged according to the characteristics of the frequency in the noise-based image generated through the frequency domain. Therefore, the noise-based image generated through the frequency domain performs a clue function to solve the geometric distortion in recognizing watermark data by a smartphone camera or the like. That is, the noise-based image generated through the frequency domain provides a clue to compensate for geometric distortion such as scale, rotation, and location using the similarity between the synchronization signal and the photographed image in the watermark data extraction process.

Figure 7:
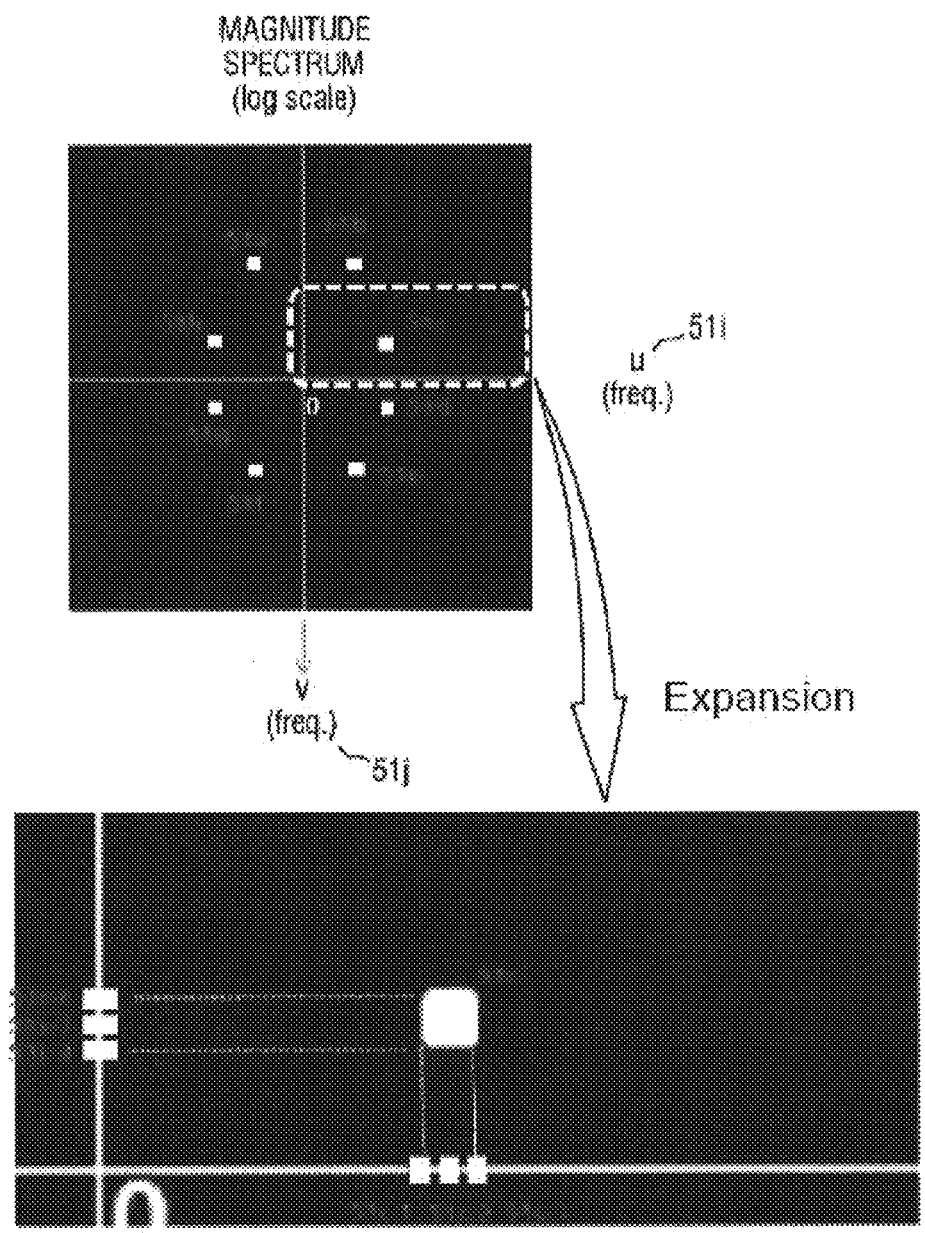

As shown in FIGS. 6 and 7, the magnitude peak may comprise a plurality of points on a plane composed of a horizontal frequency axis 51i representing unit frequencies according to discreteness of frequency, and a vertical frequency axis 51j representing unit frequencies according to discreteness of frequency. In FIGS. 6 and 7, eight magnitude peaks 51a to 51h are shown. In referring to FIG. 7, the magnitude peak 51c corresponds to three unit frequencies 51c-1, 51c-2 and 51c-3 on the horizontal frequency axis 51i, and corresponds to three unit frequencies 51c-4, 51c-5, and 51c-6 on the vertical frequency axis 51j.

Figure 8:
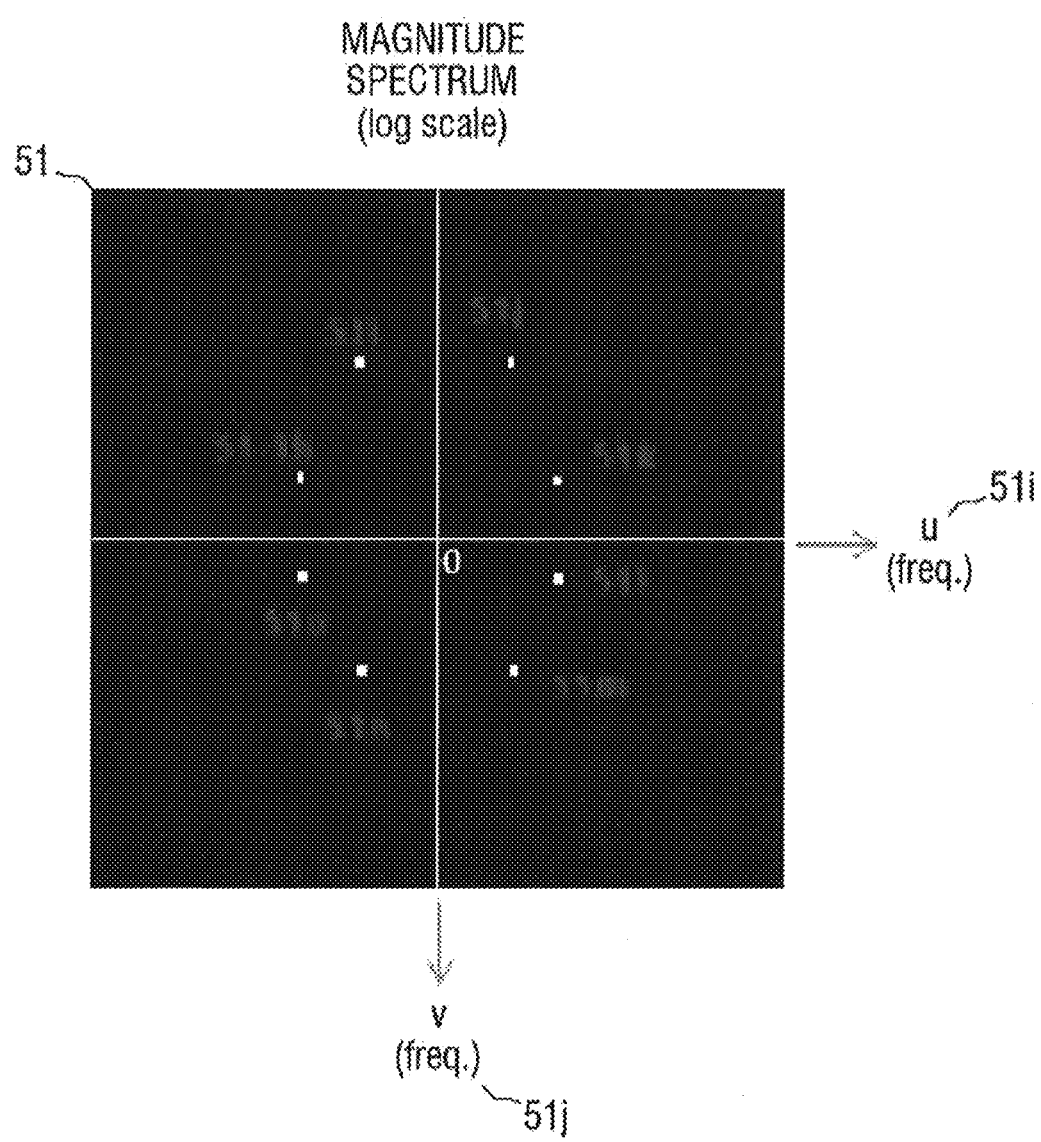

On the other hand, as shown in FIGS. 8 and 9, each magnitude peak comprised in the plurality of magnitude peaks 51k to 51r is represented by a first frequency of a horizontal axis and a second frequency of a vertical axis; the first frequency and the second frequency may correspond to one unit frequency according to the discreteness of the frequency. As shown in FIG. 9, the magnitude peak 51k corresponds to one unit frequency 51k-1 on the horizontal frequency axis 51i, and corresponds to one unit frequency 51k-2 on the vertical frequency axis 51j. In FIG. 9, when a magnitude spectrum value is expressed by a two-dimensional matrix, only one element has a value other than 0, and all other elements are also shown to have a zero. This is because the maximum magnitude value ('255' in FIG. 9) is obtained only in the region where the noise-based image corresponds to the magnitude peak, and has a minimum magnitude value ('0' in FIG. 9) in all areas except the magnitude peak.

In this embodiment, the coordinates of the magnitude peak on the magnitude spectrum for generating the noise-based image do not leak to the outside. Only the converted noise-based image is distributed to the outside in accordance with the watermarking data reflected in the original image, and the noise-based image original as shown in FIG. 10 cannot be obtained even if the image in the distributed state is processed. This is because, after blocking the noise-based image original, conversion according to the watermarking data is performed. Therefore, it is possible to prevent the watermark data embedding method according to the present embodiment from being used in an unauthorized manner. Only when watermarking embedding is performed based on the previously specified noise-based image original is it possible to extract watermark data, which will be described in detail later.

The image size of the noise-based image may be less than the original image size. Thus, if the noise-based image is reflected only in a specific area of the original image, the user must adjust the photographing angle of the original image, so that the success rate of watermark data extraction will be lowered. Therefore, as shown in FIG. 10, by connecting a plurality of the converted noise-based images in at least one of the horizontal direction and the vertical direction on the basis of the size of the original image, and by placing the noise-based image on the widest area of the original image, it is possible to succeed in extracting the watermark data regardless of which part of the original image the user is shooting. FIG. 10 shows a noise-based image 50-1 having a size of 256×256, and a noise-based image 50-1 having a size of 256×256 divided into two in the horizontal direction and two in the vertical direction, a noise-based image 50-2 connected with four noise-based images 50-1 of 256×256 size in the horizontal direction, and four noise-based images 50-3 connected in the vertical direction.

As the size of the noise-based image increases, the size of the watermarking data that can be embedded in the noise-based image also increases. Therefore, the data embedding method according to the present embodiment has scalability in terms of data size that can be embedded.

Figure 11:
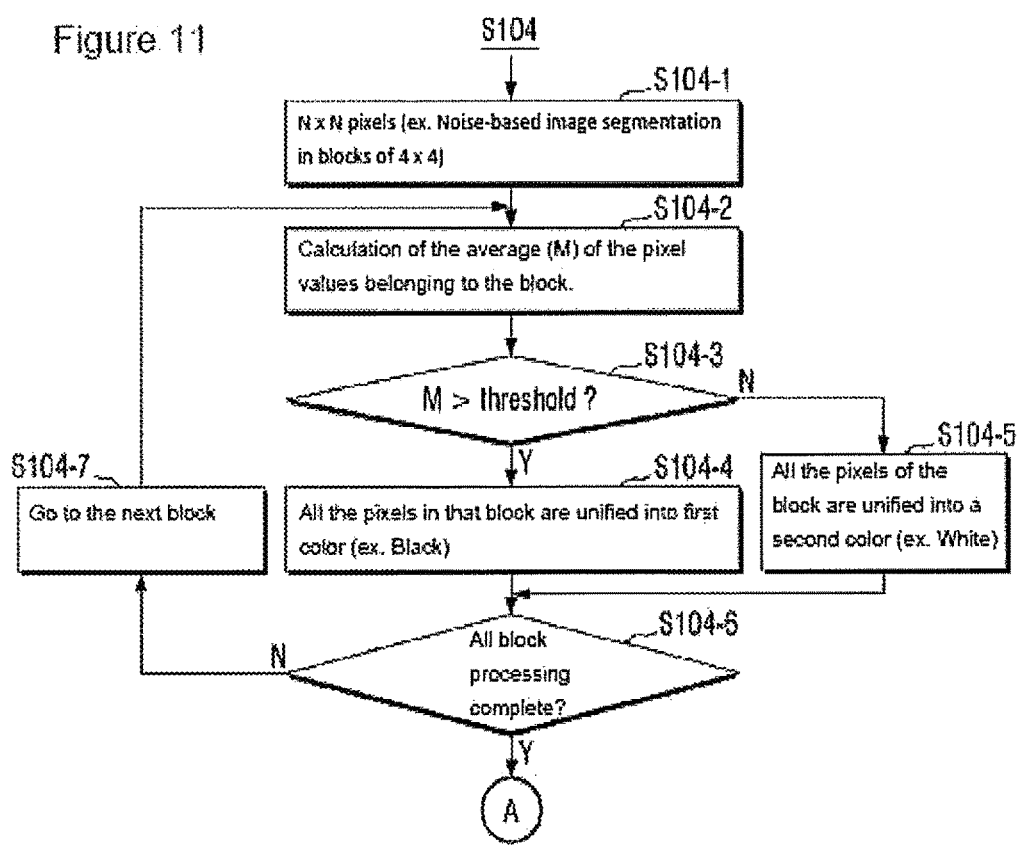
FIG. 11 is a flowchart illustrating some operations of the method of embedding watermark data, which can be understood with reference to FIG. 3, in more detail.

Hereinafter, a method (S104) of converting the noise-based image original using watermark data will be described in more detail with reference to FIG. 11.

The noise-based image is segmented in block units of N×N pixels (e.g., 4×4) (S104-1). It is preferable to form one block in a square shape composed of an even number of pixels in the horizontal and vertical directions. For example, a block may be 4×4 in size. Hereinafter, for the sake of convenience of understanding, a description will be given assuming a 4×4 size block.

Next, a random number is generated using a scheduled encryption key. Using the random number, one of the six patterns shown in FIG. 4B is chosen and the watermark data is embedded to the noise-based image. The noise-based image is then converted using the watermark data that is created using the above described rules. The converted noise-based image 60 is not significantly different from the original noise-based image 50, before addition of the watermark data. Accordingly, the robustness of the synchronization signal is significantly enhanced and the recognition rate is improved.

FIG. 4C shows a side-by-side comparison of previous converted noise-based image (left), exhibiting wave pattern, and current noise-based image (right). The slight wave pattern of the previous image damages the synchronization signal and, when detected, can reduce the recognition rate.

Figure 12:
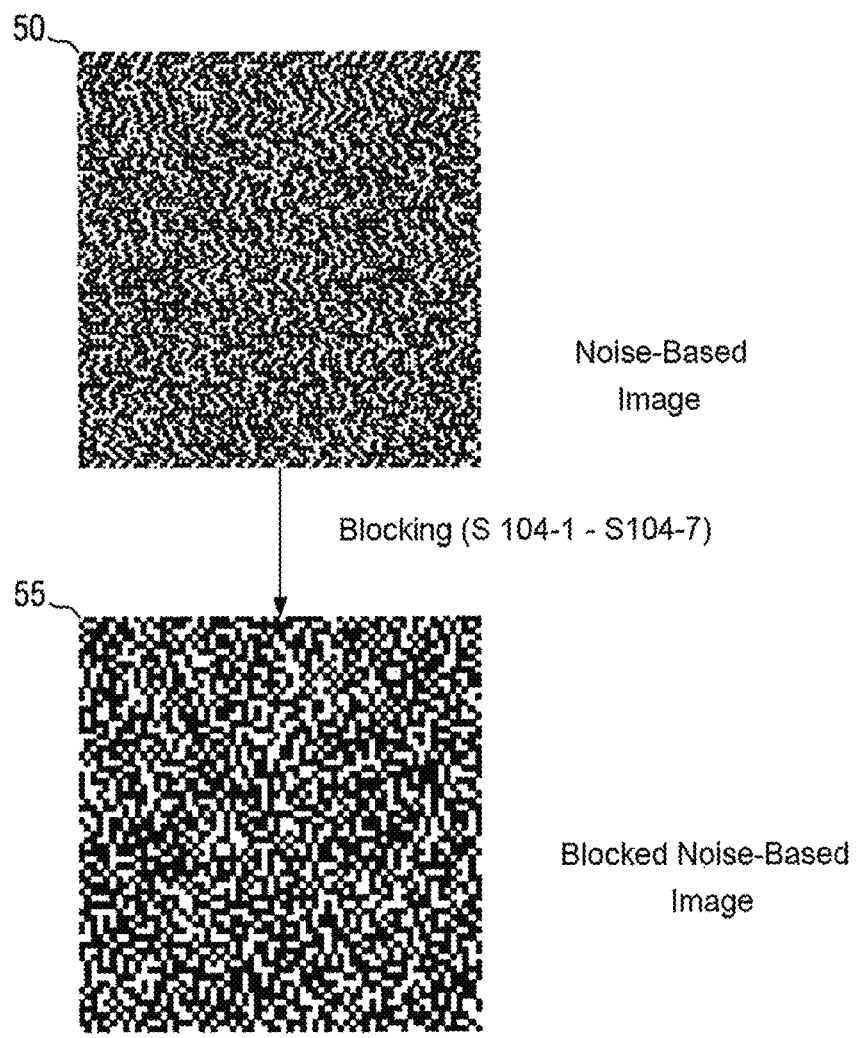
FIG. 12 is a diagram illustrating the result of blocking the noise-based image as a result of the partial operation of FIG. 11.
Figure 13:
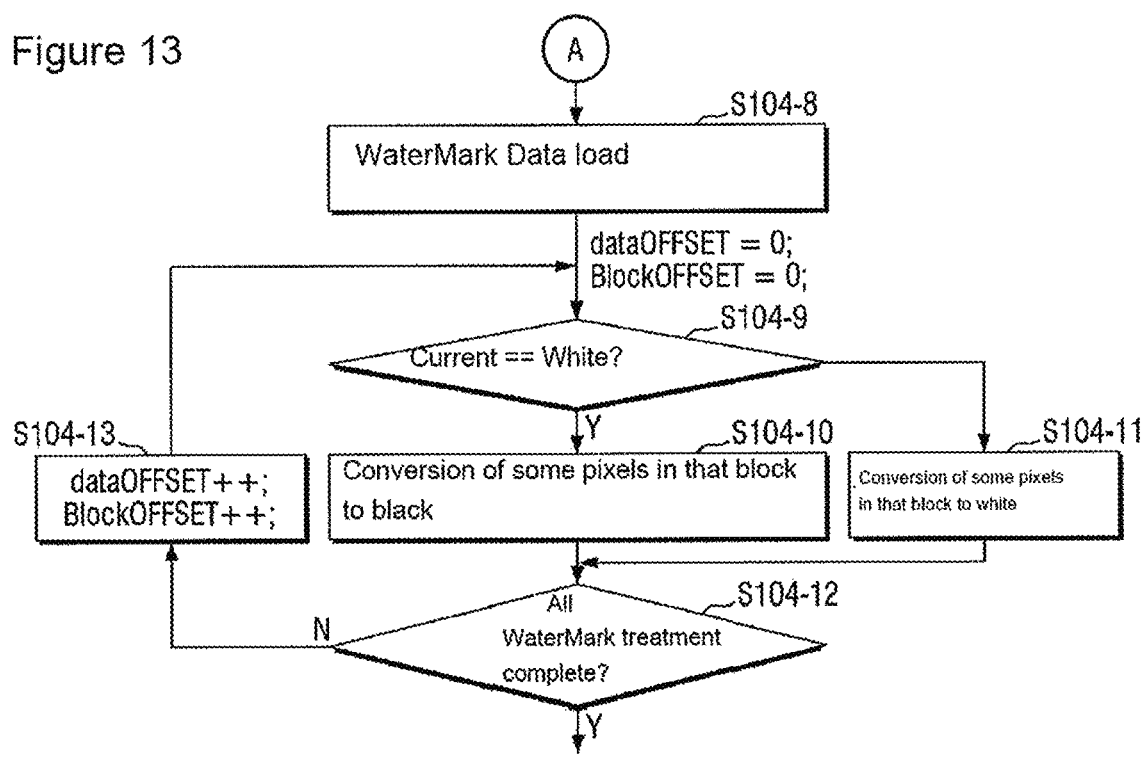
FIG. 13 is a flowchart illustrating some operations of the method of embedding watermark data, which can be understood with reference to FIG. 3, in more detail.

That is, for each block of the noise-based image, the average (M) of the pixel values belonging to the block is calculated (S104-2). If the average value M is equal to or greater than a threshold value (for example, a middle value between a pixel value indicating white and a pixel value indicating black) (S104-3), all pixels of the block have a first color (S104-4). If the average value M is less than the threshold value (S104-3), all the pixels of the block are unified into a second color (e.g., white) (S104-5). FIG. 12 shows a noise-based image 55 blocked as a result of the noise-based image blocking operations (S104-1 to S104-7) described with reference to FIG. 11.

There are three reasons for blocking the noise-based image to 4×4 before inserting the data. First, when a constant pattern of 144 bits is inserted into the noise-based image of black and white, a certain pattern is generated; by blocking in the above manner and converting according to the color of the noise-based image it is possible to prevent the occurrence of a pattern. This can have a significant impact on invisibility when the noise into which data are inserted is inserted into the original image.

Second, the recognition rate in the watermark data extraction process is increased. If the data are inserted in units of one pixel, the accuracy and speed of this technique of recognizing with a smartphone camera will be very low. Thus, blocking is performed.

Third, it does not destroy the characteristics of the synchronization signal inserted in the noise-based image. If data are inserted without performing the blocking operation, the characteristics of the noise-based image itself, that is, the characteristics of the synchronization signal, cannot survive. A completely different black and white image will be created from the noise-based image. By performing blocking, the function of maintaining the characteristics of the noise-based image itself in the block is performed; this can prevent the synchronization signal in the noise-based image from being destroyed even if data are inserted into the entire noise-based image.

Next, an operation of converting a blocked noise-based image using watermark data will be described with reference to FIGS. 13 to 16.

The watermark data are loaded (S104-8), and the operation of embedding the watermark data by 2 bits from the start offset while circulating each block of the noise-based image is performed. If the current block is white (S104-9), some pixels of the block are converted to black (S104-10). Conversely, if the current block is black (S104-9), some pixels of the block are converted to white (S104-11).

Figures 15, 16:
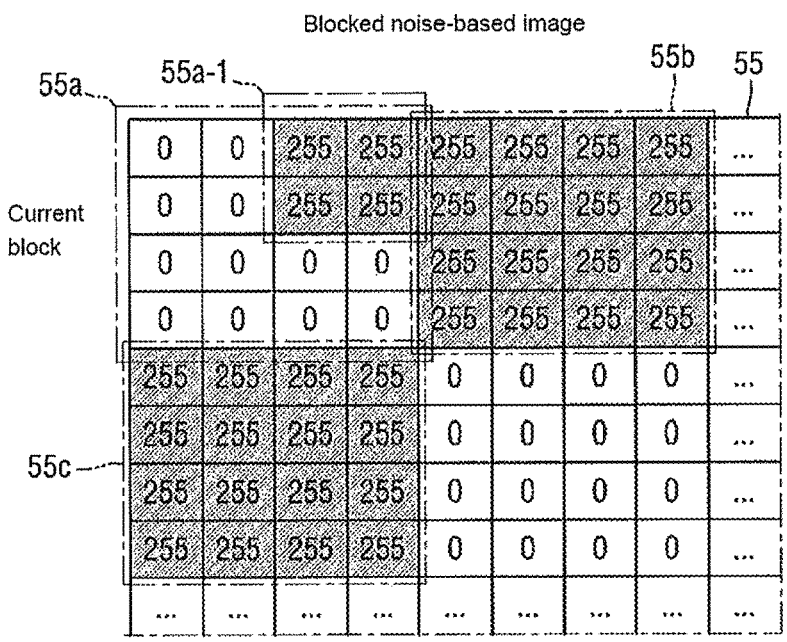

Hereinafter, conversion of some pixels of the block will be described in more detail. In FIG. 14, the 2 bits to be currently embedded are '01', the current block 55a is white, and the first block is the upper left corner of the blocked noise-based image 55. FIG. 15 is a noise-base conversion standard that may be referenced in some embodiments of the present invention. According to this standard, when the current block is white and the 2 bits to be embedded are '01', the upper right (2×2) pixels of the current block are converted to black. In accordance with this standard, the result of converting the upper-left pixels 55a-1 of the current block 55a to black is shown in FIG. 16.

As can be understood with reference to FIGS. 15 to 16, one block having the same pixel value is composed of four pixel groups. Then, one of the four pixel groups is converted to have a pixel value different from the pixel value of the whole block. For example, for a white block, only one pixel group is converted to black. Therefore, the number of cases in which the color of the pixel group can be expressed by changing the color of the block group to the color of the block is four for each block. This is the number of cases that can be represented by 2 bits. Thus, 2 bits can be embedded per block.

The 2-bit watermark data embedding operation for each block is performed while traversing each block of the noise-based image until all watermark data are embedded (S104-13). The traversal order of the noise-based images depends on the predefined order. The tour sequence according to one example is shown in FIG. 17. In FIG. 17, it is shown that 72 4×4 blocks are required for embedding watermark data of 144 bits. In view of the fact that 2 bits can be embedded per block, it can be understood that 72 of blocks 58 are required.

Figure 18:
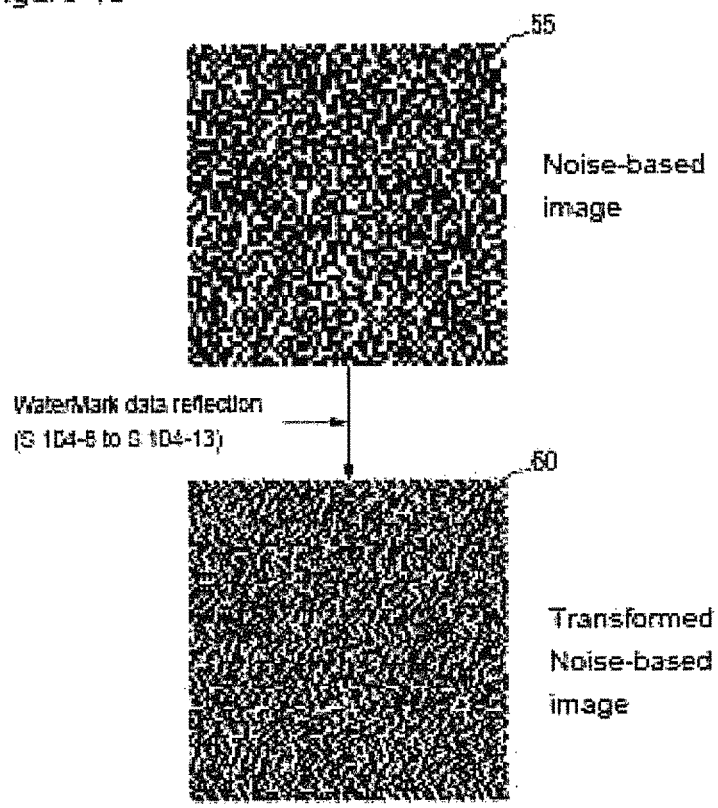
FIG. 18 is a diagram illustrating the result that the noise-based image is converted to represent the watermark data as a result of the partial operation of FIG. 13.

A 256×256 noise-based image contains a total of 4096 blocks. Even if all of the 144-bit watermark data are embedded using 72 of blocks 58, the block remains. In order to increase the watermark data extraction success rate, watermark data embedding using 72 of blocks 58 is repeated in the horizontal and vertical directions. FIG. 18 shows the result 60 that the blocked noise-based image 55 has been transformed to reflect the watermark data.

Referring again to FIG. 3, an image in which watermark data are embedded is generated by adjusting the original image using the converted noise-based image (S108). The adjustment may comprise adjusting the first pixel only if the R channel value, the G channel value, and the B channel value of the first pixel of the original image exceed or fall below the threshold. At this time, adjusting the current pixel of the original image comprises a step of adjusting the first pixel if the second pixel of the transformed noise-based image is white, and adjusting the first pixel by a second rule different from the first if the second pixel is black. For example, the first adjustment is to decrease the R channel value of the first pixel, increase the G channel value, and decrease the B channel value; and the second adjustment is to increase the R channel value of the first pixel, decrease the G channel value, and increase the B channel value.

In the adjustment, values of three constants $\alpha$, $\beta$, $\gamma$ are utilized. In the watermark data extraction process, the values of the three constants are the rates to be used when monochromating to maximize image noise. The values of the three constants $\alpha$, $\beta$, $\gamma$ can be set variously according to the image output medium. The image output medium may be various examples of paper, plastic, metal, and the like. For example, when the image output medium is paper, the values of the three constants $\alpha$, $\beta$, $\gamma$ can be set to $\alpha 1$, $\beta 1$, $\gamma 1$. If the image output medium is plastic, the values of the three constants $\alpha$, $\beta$, $\gamma$ can be set to $\alpha 2$, $\beta 2$, $\gamma 2$.

Premised on (R, G, B=Pixel values of the original R channel, G channel, and B channel before being updated; R', G', B'=pixel values of the R channel, G channel, and B channel after the update), the following adjustment rules can be considered.

First case: When the pixel value of the noise is 0 and the pixel value of the original image is larger than 250 for all of the R, G, and B channels, R'=R(1−?), G'=G(1+(3), B'=B(1−?)

Second case: When the pixel value of the noise is 0 and the pixel value of the original image is smaller than 250 for all the R, G, and B channels, R'=R (1−?), G'=G (1+?), B'=B (1−?)

Third case: When the pixel value of the noise is 255 and the pixel value of the original image is larger than 250 for all the R, G, and B channels, R'=R(1+?), G'=G(1−$\beta$), B'=B (1+?)

Fourth case: When the pixel value of the noise is 255 and the pixel value of the original image is smaller than 250 for all of the R, G, and B channels, R'=R (1+?), G'=G (1−?), B'=B (1+?)

The three constants $\alpha$, $\beta$, and $\gamma$ used to insert the noise into the original image are different depending on the original image. This technology has the characteristic that it is difficult to identify with human eyes. In order to satisfy this requirement, the values of $\alpha$, $\beta$, and $\gamma$ should be varied according to the pixel values of the original image to be inserted with noise.

Figure 28:
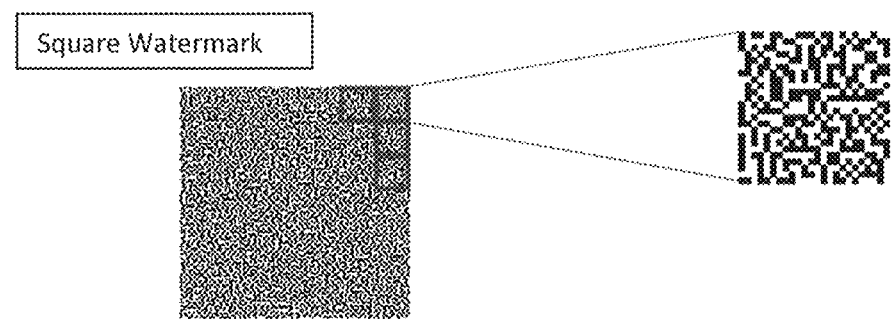
FIG. 28 is a square watermark being embedded in a tile pattern.
Figure 29:
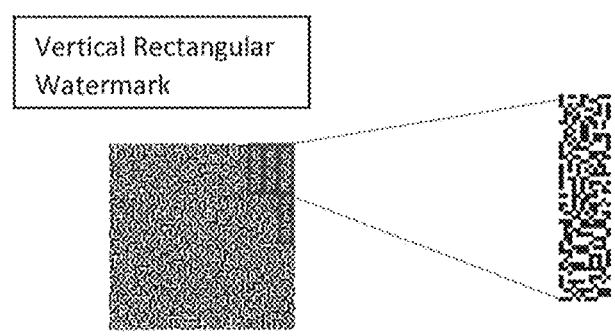
FIG. 29 illustrates a vertical rectangular-shaped watermark.
Figure 30:
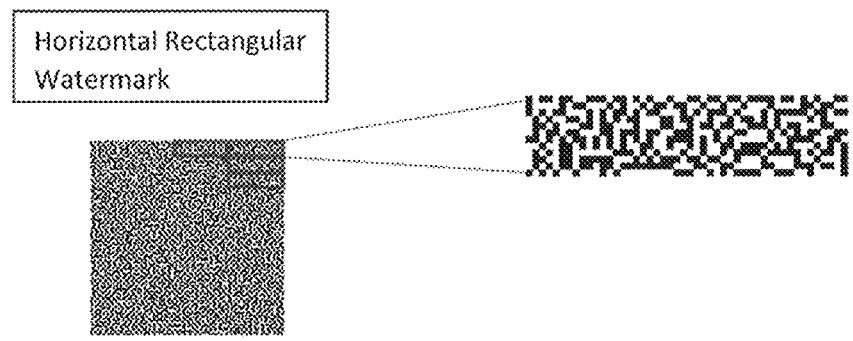
FIG. 30 illustrates a horizontal rectangular-shaped watermark.

With reference to FIGS. 28 through 32, watermark form branching is described and illustrated. As shown in FIG. 28, the existing method uses a single square-shaped watermark placed in a tile pattern. However, the use of horizontal rectangular-shaped watermarks (FIG. 29) and vertical rectangular-shaped watermarks (FIG. 30) have been developed. The shape of the watermark is flexibly modified depending on the pattern and design characteristics of the subject into which the date is inserted. This improves recognition performance.

Figure 31:
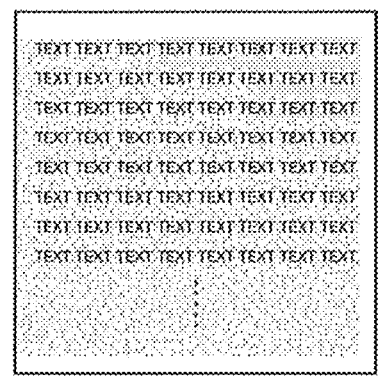
FIG. 31 is an illustration of a horizontal pattern using horizontal rectangular-shaped watermarks.
Figure 32:
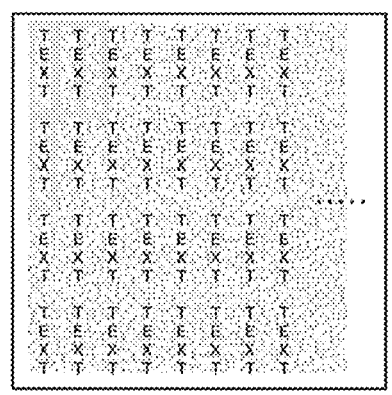
FIG. 32 is an illustration of a vertical pattern using vertical rectangular-shaped watermarks.

For example, as shown in FIG. 31, subjects with horizontal patterns have better recognition rates when a horizontal rectangular-shaped watermark is inserted. Similarly, as shown in FIG. 32, subjects with many vertical patterns have improved recognition rates when vertical rectangular-shaped watermarks are inserted.

Extraction of Watermark Data

Hereinafter, another method of extracting watermark data according to another embodiment of the present invention will be described with reference to FIG. 19 to FIG. 24. The watermark data extraction method according to the present embodiment is applicable only to the watermark data embedded by the watermark data embedding method according to the embodiment of the present invention described above. First, a description is provided with reference to FIG. 19.

The method of extracting watermark data according to this embodiment starts by receiving a photographed image (S200).

Figure 20:
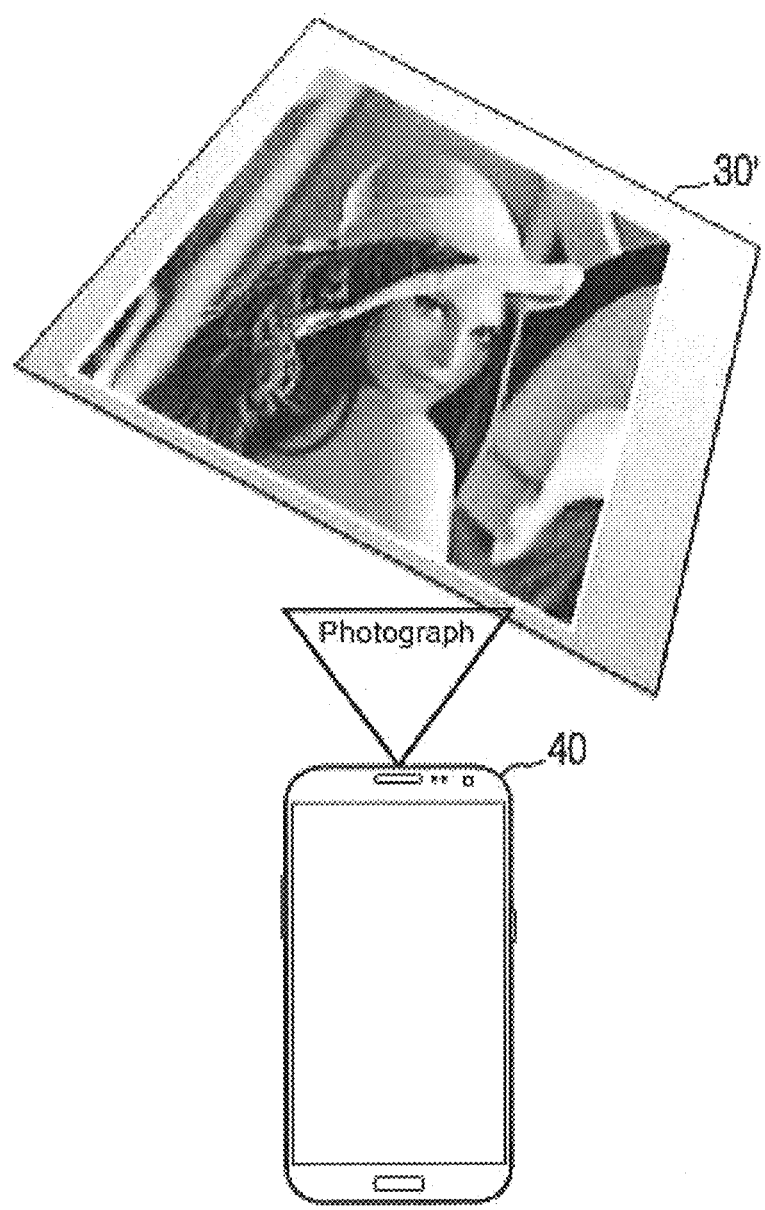
FIG. 20 is a diagram illustrating why preprocessing of the photographed images is necessary in the method of extracting watermark data according to an embodiment of the present invention.
Figure 21:
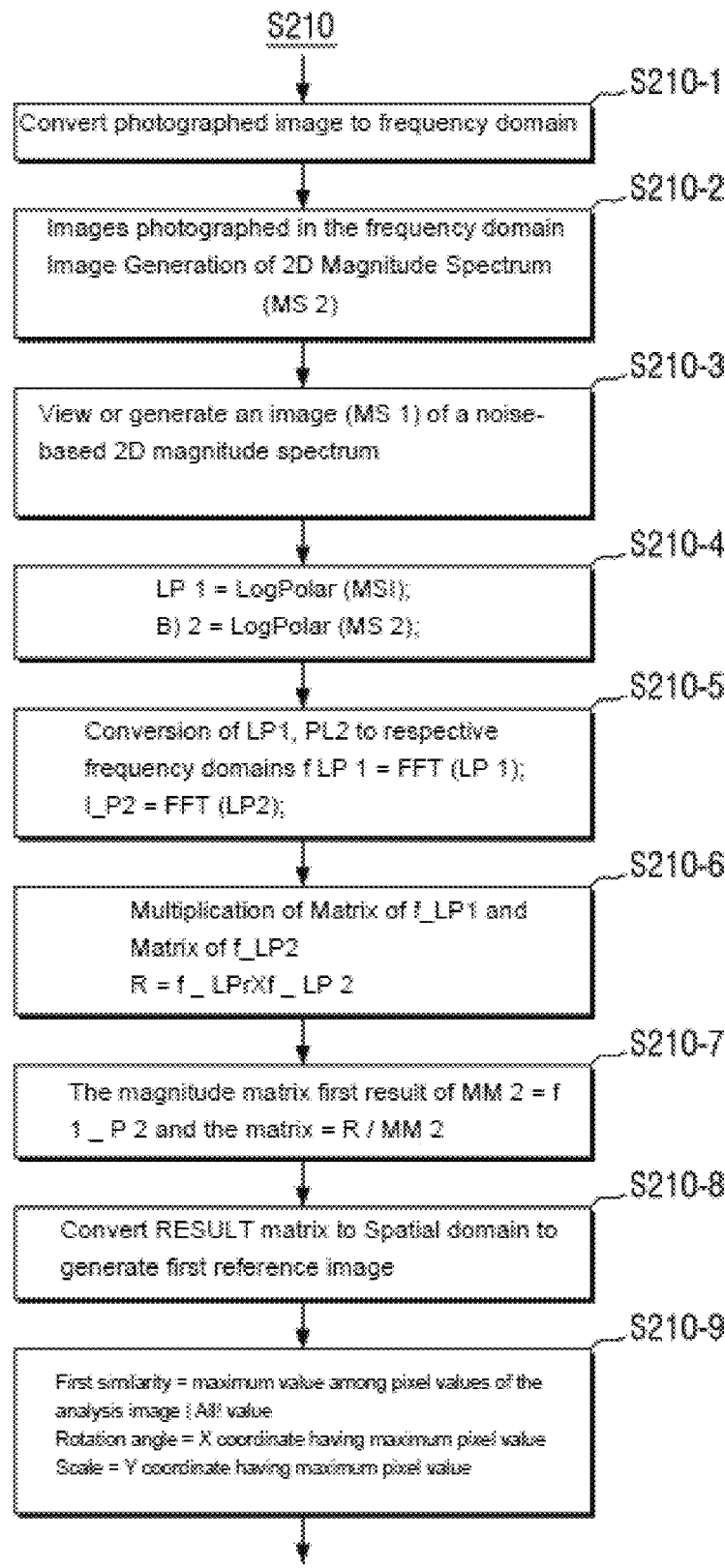
FIG. 21 is a detailed flowchart illustrating an image preprocessing related operation of the watermark data extraction method, which can be understood with reference to FIG. 19.
Figure 22:
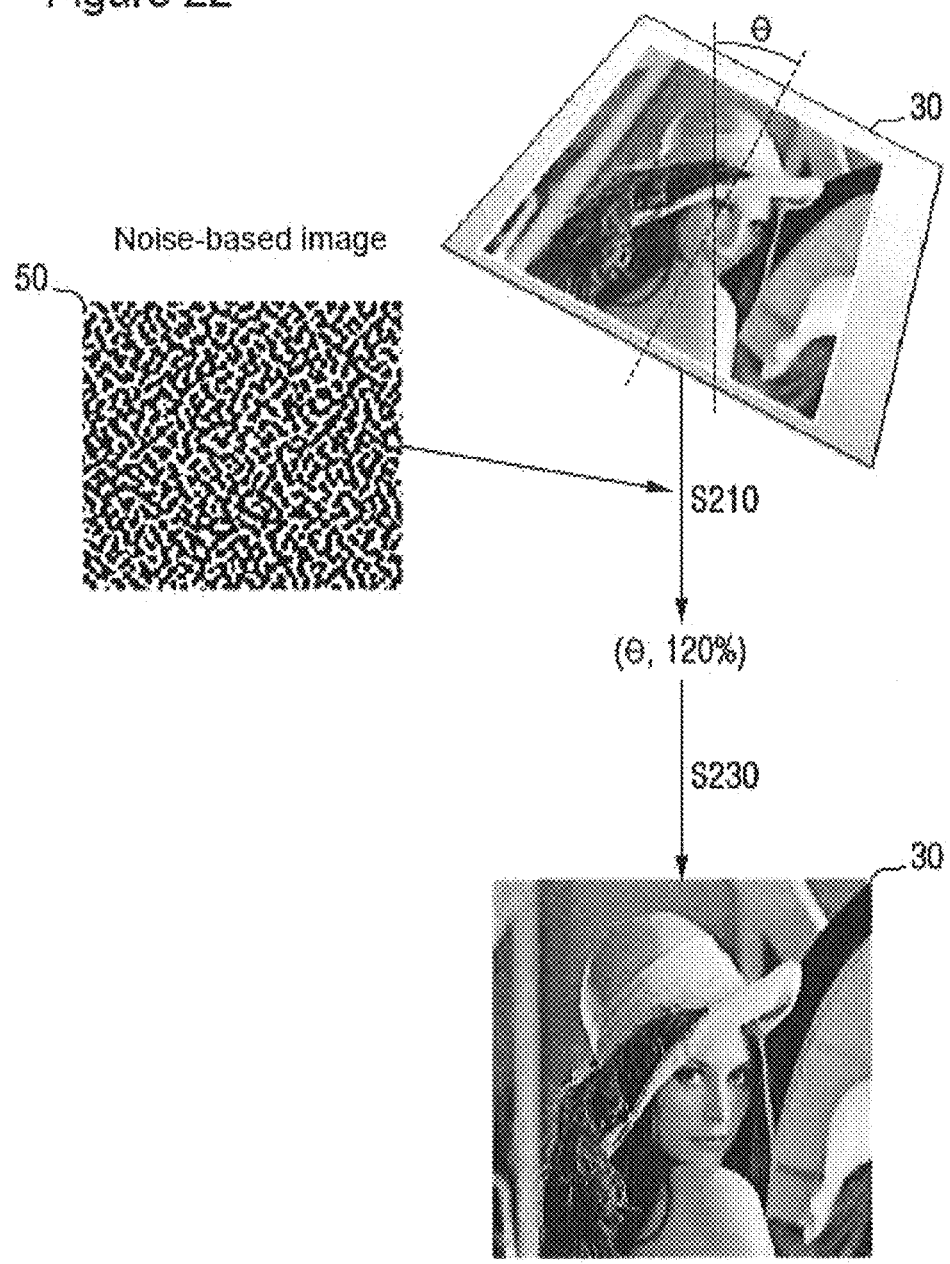
FIG. 22 is a view illustrating the result of preprocessing the photographed image.

If the watermark is extracted from the PC with the digital image file embedded with the watermark as in the existing digital watermarking technology, if the embedding process is performed in reverse, the watermark can be extracted. However, since the technology of the present invention supports recognition of a watermark using a camera of a mobile terminal such as a smart phone camera, a lot of image preprocessing is needed before extracting the watermark. Referring to FIG. 20, a user of the smartphone 40 can photograph a medium 30' on which an image with embedded watermarking data is printed, without paying special attention to extracting watermarking data. The watermark data extraction method according to the present embodiment has been developed so that the watermark data can be extracted even in this case.

The preprocessing process makes it possible to maintain a high recognition rate even among many variables such as the position, size, rotation, brightness, and damage of the object to determine the presence or absence of a watermark in the photograph taken on the camera. In this process, the existence of the watermark is detected using the synchronization signal inserted in the embedding process, and the image is transformed to the optimum condition for extracting the data.

Prior to performing the preprocessing process in earnest, a pre-correction may be performed. For example, when an object to determine the presence of a watermark is illuminated using a smartphone camera, the preview on the smartphone screen is captured at 1920×1080 size. After that, all the pixel values of the captured image are changed to the RGB form. The embodiments of the present invention perform operations based on RGB.

Next, since the possibility for the object to be displayed in the center of the screen is very high when the user views the object with the camera, the center region is extracted with the image of 1024×1024 size in order to reduce the unnecessary calculation.

Next, the extracted square image is reduced to 256×256 size.

Next, the image reduced to 256×256 size is made to be clear through one Deblur process.

The above-described pre-correction can be performed on the provided captured image (S200).

Next, the noise-based image is loaded (S205), and the first similarity, the rotation angle, and the scale are confirmed through comparison using the captured image after the pre-correction and the processing in the frequency domain of the noise-based image (S210). This operation will be described in more detail with reference to FIG. 21.

First, the photographed image is converted into a frequency domain (S210-1), and an image MS2 of a 2D magnitude spectrum is generated (S210-2). Also, an image MS1 of a noise-based image 2D magnitude spectrum to be compared with the photographed image is prepared (S210-3). The image MS1 of the noise-based image 2D magnitude spectrum may be generated from a previously stored noise-based image, or may simply be retrieved from pre-stored data.

Next, the image MS1 of the 2D magnitude spectrum of the noise-based image and the image MS2 of the 2D magnitude spectrum of the photographed image are LogPolar transformed (S210-5). Because the LogPolar transformation has unchanging properties in two-dimensional rotation and magnitude transformation, by using the LogPolar transformation, it is possible to obtain the effect of remedying the defect of the photographed image which can be trusted in terms of rotation and size.

Next, the image created as a result of the LogPolar conversion is converted into the frequency domain (S210-5) and the result of the conversion to the frequency domain is multiplied (S210-6); thereafter, division is performed to a magnitude matrix of the result (f_LP2) of the frequency domain conversion of the photographed image to generate a first result matrix (S210-7). The first result matrix may be understood as a matrix indicating how much the noise-based image is comprised in the photographed image and the ratio. Also, the first result matrix can be understood as a matrix indicating the degree of similarity between the photographed image and the image of the noise-based image.

Next, the first result matrix is transformed into a spatial domain to generate a first reference image (S210-8). The first degree of similarity is calculated using the first reference image (S210-9). The first degree of similarity is a maximum value among the pixel values of the first reference image. The rotation angle is the X coordinate of the pixel whose pixel value is the maximum value, and the scale is the Y coordinate of the pixel (S210-9).

Figure 19:
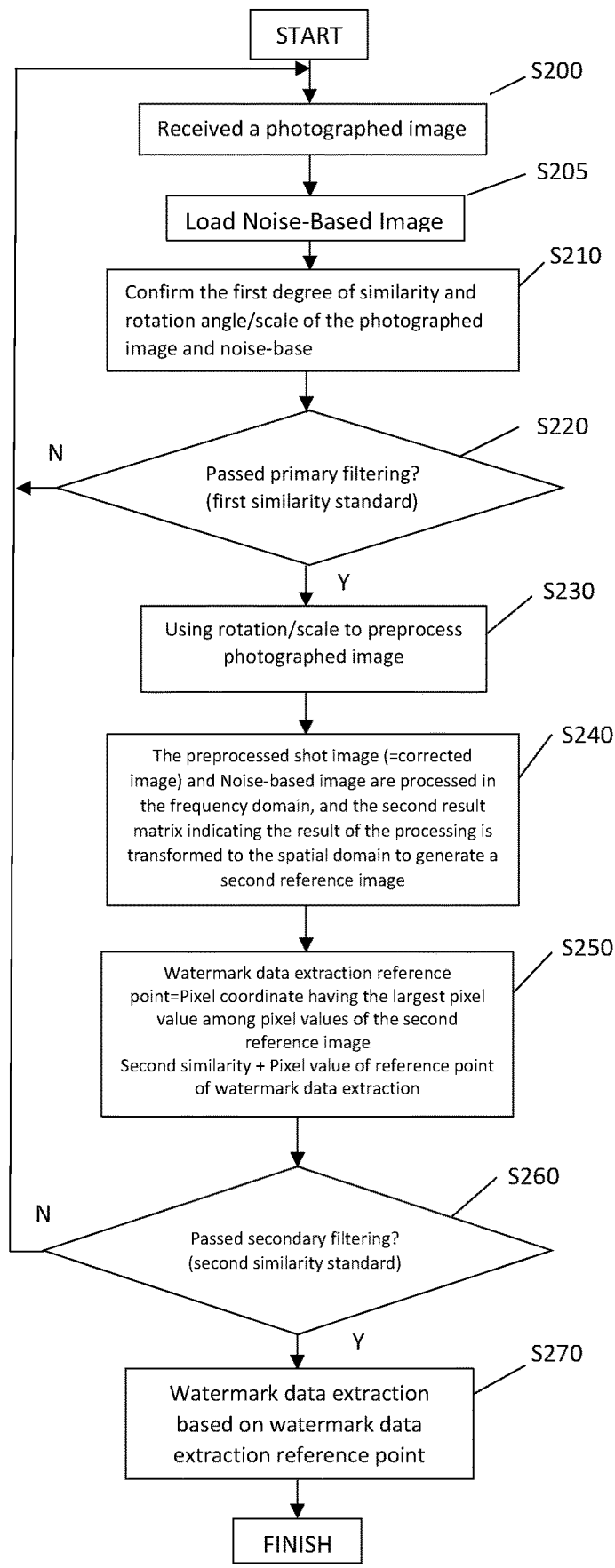
FIG. 19 is a flowchart of a watermark data extraction method according to another embodiment of the present invention.

A description is provided with reference to FIG. 19. If the first similarity is less than the reference value, the watermarked image is returned to the initial state in which the watermark data is not embedded (S220). If the first degree of similarity is equal to or greater than the reference value, preprocessing of the photographed image is performed using the obtained rotation angle and scale (S230). The result can be understood with reference to FIG. 22. As a result of the preprocessing, the orientations of the photographed images are matched and the size is adjusted to match the comparison with the noise-based image.

A description is provided with reference to FIG. 19.

The adjusted photographed image is processed in the frequency domain, and an operation for determining a watermarking extraction reference point is performed. First, the preprocessed shot image (corrected image) and the noise-based image are processed in the frequency domain; then the second result matrix indicating the processing result is converted into a spatial domain to generate a second reference image (S240).

Figure 23:
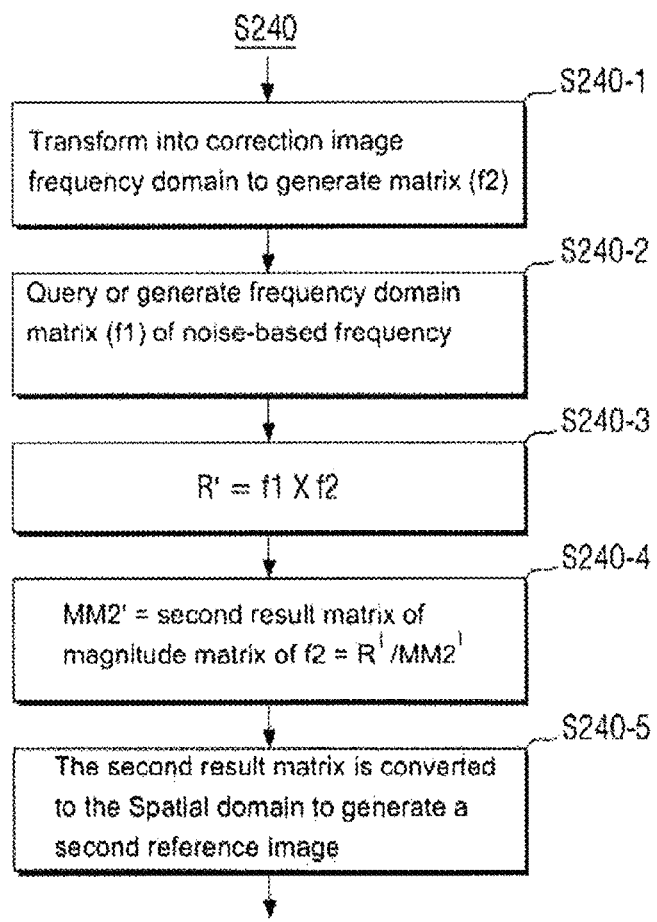
FIG. 23 is a detailed flowchart illustrating operations related to image processing related to determination of a watermarking extraction reference point of a watermark data extraction method that can be understood with reference to FIG. 19.
Figure 24:
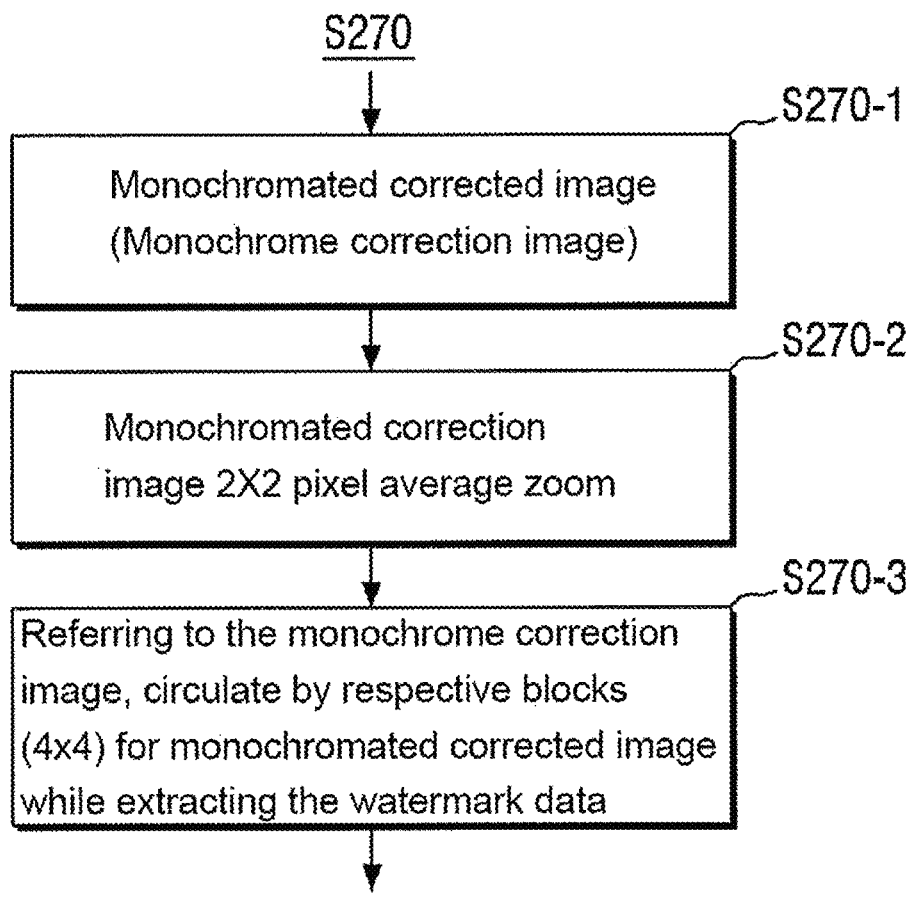
FIG. 24 is a detailed flowchart illustrating data extraction related operation of the watermark data extraction method, which can be understood with reference to FIG. 19.

The operation S240 of generating the second reference image will be described with reference to FIG. 23. The operation of generating the second reference image is similar to that of the first reference image except that the LogPolar transformation is not performed. Performed are the conversion of the corrected image into the frequency domain (f2) (S240-1); inquiry or generation of a domain matrix (f1), which is a dominant wave of the noise-based image (S240-2); a matrix R' generation by multiplying f1 and f2 (S240-3); dividing R' into a magnitude matrix of f2 to form a second result matrix S240-4, and transforming the second result matrix into a spatial domain to generate a second reference image (S240-5). The second result matrix can be understood as a matrix indicating the ratio of the noise-based image included in the correction image.

By analyzing the second reference image, it is possible to obtain information on the similarity between the corrected image and the noise-based image and the noise-based image position in the corrected image. That is, the coordinate of the reference pixel having the largest pixel value among the pixel values of the second reference image is the reference point, which is the watermark data extraction position, and the pixel value of the reference pixel is the second similarity (S250). If the second degree of similarity does not meet the standard, it is determined that there is no watermark data, and the process returns to the initial operation of extracting the watermark data (S260).

Next, watermarking data is extracted based on the watermarking data extraction reference point (S270). A description thereof is provided with reference to FIG. 24. First, the corrected image is made monochrome (S270-1). In this case, the same three constants $\alpha$, $\beta$, and $\gamma$ are used to insert the noise into the original image. As a result, the noise representation in the corrected image will be maximized.

Then, the monochrome corrected image is obtained by averaging the pixel values in units of 2×2 pixels, and the average value is compared with the reference value to unify all the pixels into either white or black in units of 2×2 pixels (S270-2). Next, referring to the noise-based image blocked in 4×4 pixel units, watermarking data are extracted while circulating the 4×4 block for each monochrome corrected image (S270-3). The operation of extracting 2 bits per block can be understood in the reverse order of the embedding process described with reference to FIG. 14 to FIG. 16. In addition, the order of traversing each block is the same as the block traversal order of the embedding process.

When the extracted data is concatenated, the entire watermark data is generated.

The methods according to the embodiments of the present invention described so far can be performed by the execution of a computer program embodied in computer readable code. The computer program may be transmitted from a first computing device to a second computing device via a network, such as the Internet, and installed in the second computing device, thereby enabling it to be used in the second computing device. The first computing device and the second computing device all include a server device, a physical server belonging to a server pool for cloud services, and a fixed computing device such as a desktop PC.

The computer program may be stored in a recording medium such as a DVD-ROM, a flash memory device, or the like.

Figure 25:
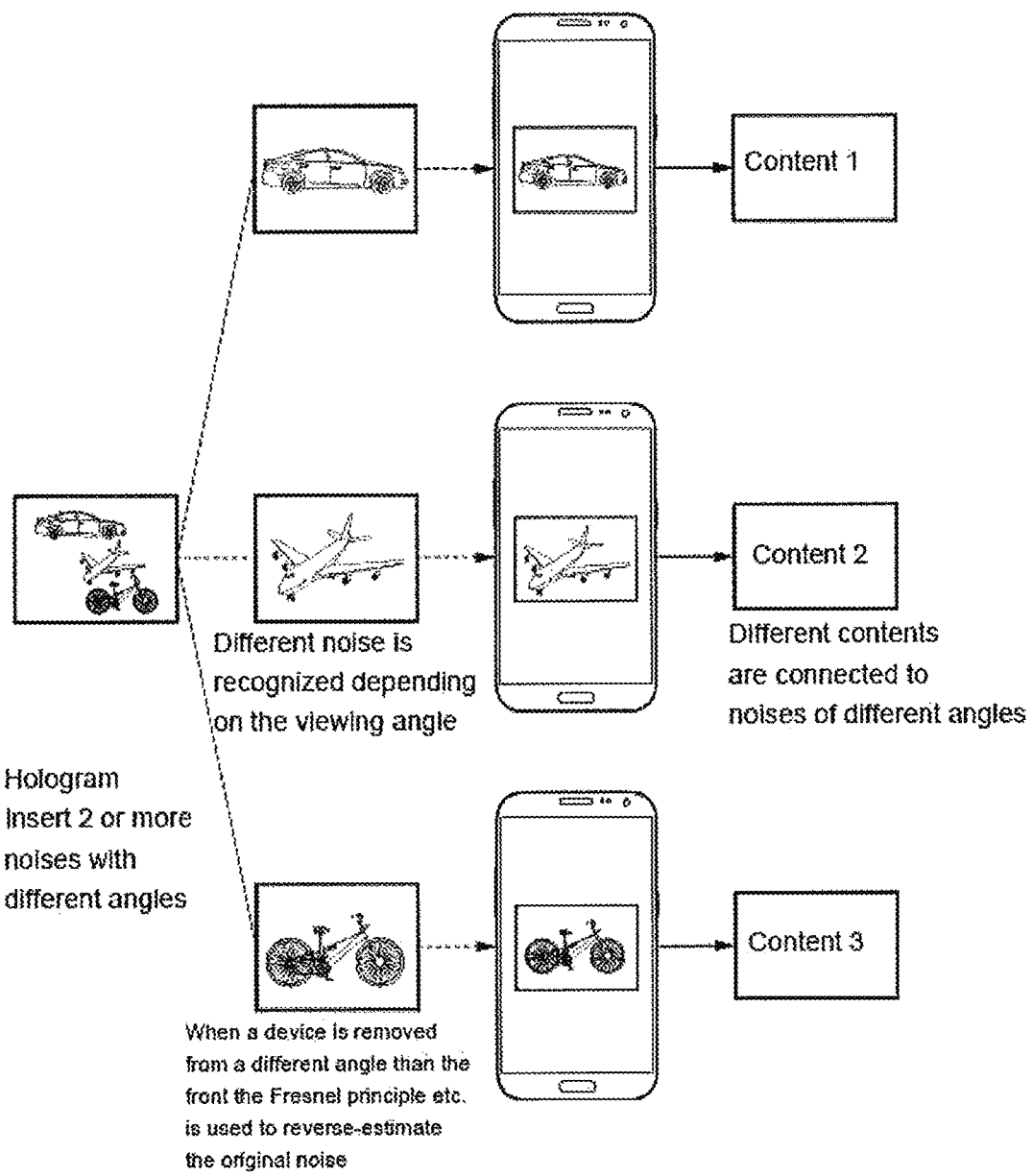
FIG. 25 is a view illustrating a method of extracting different watermark data on the basis of an imaging angle according to another embodiment of the present invention.

The method of embedding and extracting watermark data according to the embodiment of the present invention may be implemented by modifying the form of recognizing different noise according to the viewing direction as shown in FIG. 25

Figure 26:
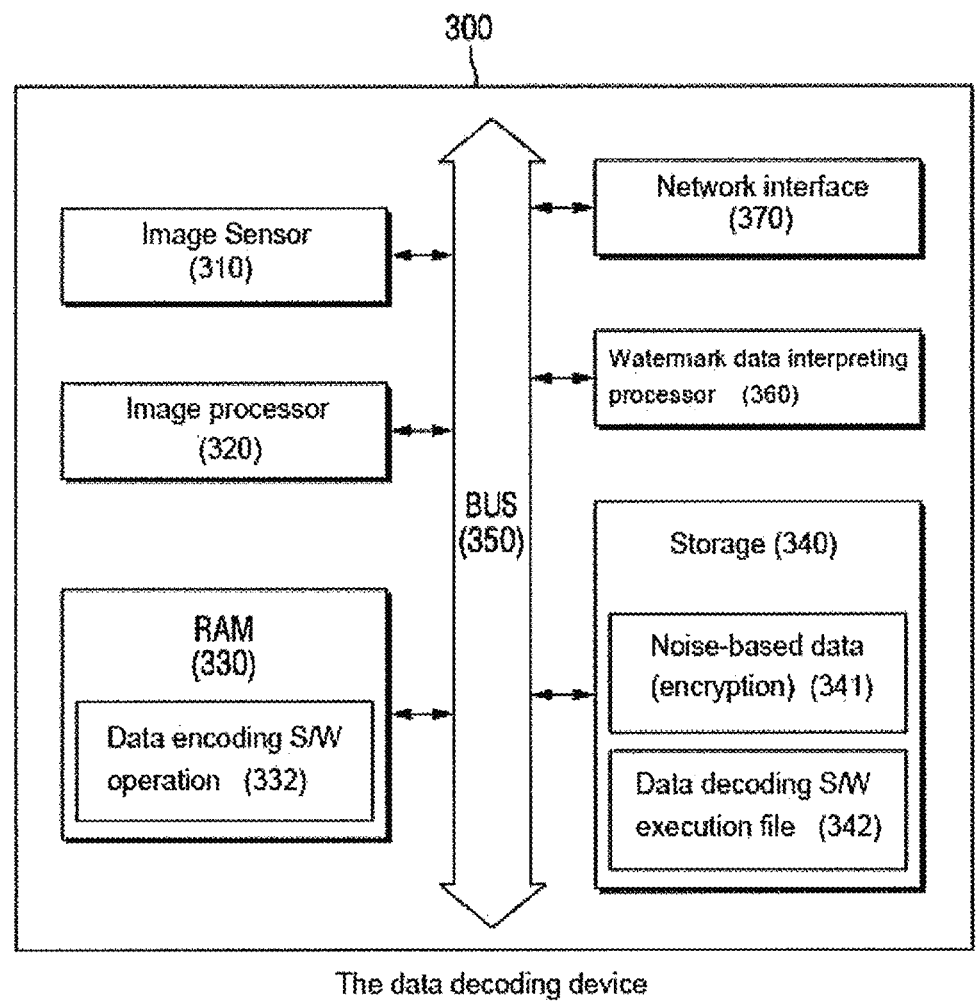
FIG. 26 is a block diagram of a watermark data embedding apparatus according to another embodiment of the present invention.

Hereinafter, the configuration and operation of a data embedding apparatus according to another embodiment of the present invention will be described with reference to FIG. 26. As shown in FIG. 26, the data embedding apparatus 300 according to the present embodiment comprises a memory (RAM) 330, an image processor 320 that executes data embedded software operations loaded into the memory 330, and a storage 340. In one embodiment, the embedding device 300 may further comprise an image sensor 310, a network interface 370, a system bus 350, and a printer interface 360.

The storage 340 stores an executable file (binary file) 342 of data embedding software that implements the data embedding method described with reference to FIGS. 1 to 18 in software form. The executable file 342 of the data embedding software may be loaded into the memory 330 via the bus 350. FIG. 26 shows the operation 332 of the data embedding software loaded into the memory 330.

The storage 340 may further store the noise-based image data 341. In one embodiment, the storage 340 may store the noise-based image data 341 in an encrypted form to prevent leakage of the noise-based image original to the outside. In one embodiment, the storage 340 comprises noise-based image data in the form of a resource in a data embedding software executable file; it is possible to prevent the noise-based image original from leaking to the outside.

The data embedding device 300 may receive the watermarking data from the external device via the network interface 370, receive direct input from the user through a keyboard, a mouse, or the like (not shown) or read the watermarking data (not shown) stored in the storage 340. The data embedding apparatus 300 can acquire the original image to be embedded with the watermarking data from the image sensor 310 that captures the object, can receive from an external device via the network interface 370, or can read the watermarking data (not shown) stored in the storage 340.

The data embedding device 300 may input the watermarking data and the original image to the data embedding software and transmit the resulting image to the external device via the network interface 370, display on a display device (not shown), or print via a printing apparatus connected through the printer interface 360.

The data embedding device 300 according to the present embodiment may be, for example, a computing device or a printing device. If the data embedding device 300 is a printing device, the data embedding device 300 may comprise components for performing a printing function instead of the printer interface 360.

Figure 27:
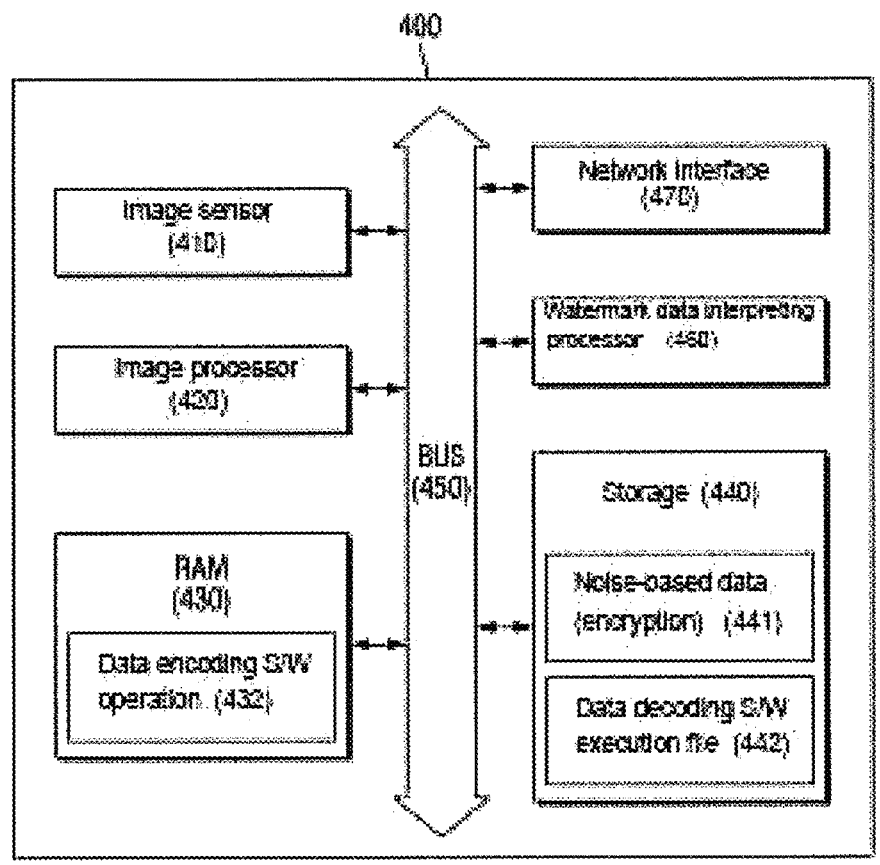
FIG. 27 is a block diagram of a watermark data extracting apparatus according to another embodiment of the present invention.

Hereinafter, the configuration and operation of a data decoding apparatus according to another embodiment of the present invention will be described with reference to FIG. 27. In this specification, the decoding of watermarking data and the extraction of watermarking data indicate substantially the same operations. As shown in FIG. 27, the data decoding apparatus 400 according to the present embodiment comprises a memory (RAM) 430, an image processor 420 that executes data decoding software operations loaded into the memory 430, and a storage 440. In one embodiment, the decoding device 400 may further comprise an image sensor 410, a network interface 470, a system bus 350 and a watermarking data interpretation processor 460.

The storage 440 stores an executable file (binary file) 442 of data decoding software that implements the data extraction method described with reference to FIGS. 1 to 18 in software form. The executable file 442 of the data decoding software may be loaded into the memory 430 via the bus 450. FIG. 27 shows the operation 432 of the data decoding software loaded into the memory 430.

The storage 440 may further store the noise-based image data 441. In one embodiment, the storage 440 stores noise-based image data 441; it may store in an encrypted form, or may comprise noise-based image data in the form of a resource in a data embedding software executable file, and it is possible to prevent noise-based image originals from leaking to the outside.

The data decoding apparatus 400 may obtain data of the photographed image from the image sensor 410 that captures an object on which an image embedded with watermarking data is printed, may receive from an external device via the network interface 470, or may obtain data of the photographed image stored in the storage 440. The data of the photographed image are loaded into the memory 430 via the system bus 450; this is referred to in the execution of the data embedding software operation 432.

The data decoding device 400 may display the extracted watermark data on the display (not shown) as a result of execution of the data embedding software operation 432, transmit to the external device via the network interface 470, or store in storage 440.

In one embodiment, the data decoding apparatus 400 may comprise a watermarking data analysis processor 460 that performs a process using the extracted watermark data. For example, the body data of the watermark data may be extracted (see Table 1), and the content request containing the body data and control parameters (see Table 1) transmitted to the content server (not shown) via the network interface 470. A display device (not shown) of the data decoding device 400 may display the received content as a response to the content request from the content server.

The data decoding apparatus 400 according to the present embodiment may be, for example, a mobile terminal equipped with a camera.

Although the embodiments of the present invention have been described with reference to the accompanying drawings, it will be understood by those skilled in the art that the present invention may be embodied in other specific forms without departing from the spirit or essential characteristics thereof. It is therefore to be understood that the above-described embodiments are illustrative in all aspects and not restrictive.

What is claimed is:

1. A data extracting method for extracting watermark data from a captured image in which the watermark data are an embedded image, the data extracting method comprising the steps of:
generating a correction image from a photographed image;
monochromating the correction image to maximize an expression of noise inherent in the correction image to create a monochromated corrected image;
generating a second two-dimensional result matrix indicating whether a noise-based image is comprised in the photographed image by performing a frequency domain process of comparing the photographed image with the noise-based image;
transforming the second two-dimensional result matrix into a spatial domain to generate a second reference image;
determining a reference point that is an extraction position of the watermark data in the captured image using the second reference image, and
extracting the watermark data from a reference point of the photographed image with reference to the noise-based image;
wherein, the step of generating the second two-dimensional result matrix comprises the step of generating a second result matrix indicating whether the noise-based image is comprised in the corrected image by performing a process in a frequency domain that compares the monochromated corrected image with a noise-based image;

wherein, the step of determining the extraction position of the watermark data comprises the step of determining a reference point that is an extraction position of the watermark data in the monochromated corrected image; and wherein, the step of extracting the watermark data comprises the step of extracting the watermark data from the monochromated corrected image.

2. The data extracting method of claim 1, wherein the step of generating a second two-dimensional result matrix indicating whether the noise-based image is included in the monochromated corrected image comprises the steps of:

generating a first two-dimensional matrix indicating the noise-based image of the frequency domain;

generating a second two-dimensional matrix indicating the monochromated corrected image of the frequency domain; and multiplying the first matrix by the second matrix and then dividing the corrected image by the magnitude matrix of the corrected image in the frequency domain to generate the second result matrix.

3. The data extracting method of claim 1, wherein the step of generating a second two-dimensional result matrix indicating whether the noise-based image is included in the monochromated corrected image comprises the steps of:

generating a first two-dimensional matrix indicating the noise-based image of the frequency domain;

extracting the watermark data from the monochromated corrected image;

blocking the monochromated corrected image with a block unit composed of M×M pixels, the blocking based on the reference point;

unifying all pixels belonging to a partial block composed of N×N pixels, where N=M/2, into either white or black, for each block of the monochromated corrected image;

extracting 2-bit data for each block by circulating each block of the monochromated corrected image with reference to a noise-based image blocked units of blocks composed of M×M pixels; and configuring the watermark data by concatenating the extracted data.

4. The data extracting method of claim 1, wherein the noise-based image is represented by a two-dimensional magnitude spectrum and a random phase having a magnitude peak of a predetermined coordinate set in a frequency domain.

* * * * *